(12) United States Patent
Thomas et al.

(10) Patent No.: US 11,808,364 B2
(45) Date of Patent: Nov. 7, 2023

(54) VALVE BODY

(71) Applicant: Kerr Machine Co., Sulphur, OK (US)

(72) Inventors: Micheal Cole Thomas, Ardmore, OK (US); Christopher Todd Barnett, Stratford, OK (US); Nicholas Son, Davis, OK (US); John Keith, Ardmore, OK (US); Kelcy Jake Foster, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 17/984,406

(22) Filed: Nov. 10, 2022

(65) Prior Publication Data

US 2023/0141854 A1 May 11, 2023

Related U.S. Application Data

(60) Provisional application No. 63/289,727, filed on Dec. 15, 2021, provisional application No. 63/281,774, filed on Nov. 22, 2021, provisional application No. 63/278,479, filed on Nov. 11, 2021.

(51) Int. Cl.
*F16K 1/46* (2006.01)
*F16K 25/00* (2006.01)
*F16K 1/38* (2006.01)

(52) U.S. Cl.
CPC ............... *F16K 1/46* (2013.01); *F16K 1/385* (2013.01)

(58) Field of Classification Search
CPC ............ F16K 1/46; F16K 1/385; F16K 25/00
USPC ...................................................... 251/317.01
See application file for complete search history.

(56) References Cited

U.S. PATENT DOCUMENTS

| | | |
|---|---|---|
| 677,137 A | 6/1901 | Leavitt |
| 1,316,539 A | 9/1919 | Ford |
| 1,662,725 A | 3/1928 | Toney, Jr. |
| 1,822,682 A | 9/1931 | Weiger |
| 1,836,498 A | 12/1931 | Gustav |
| 2,495,880 A | 1/1950 | Volpin |
| 2,713,522 A | 7/1955 | Petch |
| 2,756,960 A | 7/1956 | Church |
| 2,771,846 A | 11/1956 | Horton et al. |
| 2,783,810 A | 3/1957 | Wrigley |
| 2,828,696 A | 4/1958 | Wright |
| 2,856,857 A | 10/1958 | Saalfrank |
| 2,957,422 A | 10/1960 | Loeber |
| 3,005,412 A | 10/1961 | Camp |
| 3,053,500 A | 9/1962 | Atkinson |
| 3,146,724 A | 9/1964 | Cornelsen |
| 3,152,787 A | 10/1964 | Timmons |
| 3,173,648 A | 3/1965 | McGuire et al. |
| 3,179,121 A | 4/1965 | Bredtschneider et al. |
| 3,244,424 A | 4/1966 | Cope |
| 3,257,952 A | 6/1966 | McCormick |

(Continued)

FOREIGN PATENT DOCUMENTS

| | | |
|---|---|---|
| CN | 207974953 U | 10/2018 |
| EP | 2494140 B1 | 5/2017 |

(Continued)

*Primary Examiner* — Paul J Gray
(74) *Attorney, Agent, or Firm* — Tomlinson McKinstry, P.C.

(57) ABSTRACT

A valve configured to seal against a valve seat. The valve and valve seat are configured to be installed within a fluid end. A recess is formed within the valve for receiving a seal. A shape of the recess and a shape of the valve are designed to reduce wear to the seal during operation.

15 Claims, 35 Drawing Sheets

(56) References Cited

U.S. PATENT DOCUMENTS

| | | |
|---|---|---|
| 3,301,197 A | 1/1967 | Dodson |
| 3,309,013 A | 3/1967 | Bauer |
| 3,373,695 A | 3/1968 | Yohpe |
| 3,427,988 A | 2/1969 | Redman et al. |
| 3,463,527 A | 8/1969 | Baker |
| 3,474,808 A | 10/1969 | Elliott |
| 3,508,849 A | 4/1970 | Weber |
| 3,589,387 A | 6/1971 | Raymond |
| 3,679,332 A | 7/1972 | Yohpe |
| 3,702,624 A | 11/1972 | Fries |
| 3,746,483 A | 7/1973 | Hindel et al. |
| 3,756,229 A | 9/1973 | Ollivier |
| 3,887,305 A | 6/1975 | Ito |
| 4,047,850 A | 9/1977 | Berthelot |
| 4,170,214 A | 10/1979 | Gill et al. |
| 4,174,194 A | 11/1979 | Hammelmann |
| 4,363,463 A | 12/1982 | Moon, Jr. |
| 4,388,050 A | 6/1983 | Schuller |
| 4,467,703 A | 8/1984 | Redwine et al. |
| 4,470,771 A | 9/1984 | Hall et al. |
| 4,494,415 A | 1/1985 | Elliston |
| 4,518,329 A | 5/1985 | Weaver |
| 4,520,837 A | 6/1985 | Cole et al. |
| 4,616,983 A | 10/1986 | Hanafi |
| 4,768,933 A | 9/1988 | Stachowiak |
| 4,771,801 A | 9/1988 | Crump et al. |
| 4,773,833 A | 9/1988 | Wilkinson et al. |
| 4,778,347 A | 10/1988 | Mize |
| 4,861,241 A | 8/1989 | Gamboa et al. |
| 4,878,815 A | 11/1989 | Stachowiak |
| 4,891,241 A | 1/1990 | Hashimoto et al. |
| 4,948,349 A | 8/1990 | Koiwa |
| 4,984,970 A | 1/1991 | Eickmann |
| 5,059,101 A | 10/1991 | Valavaara |
| 5,061,159 A | 10/1991 | Pryor |
| 5,073,096 A | 12/1991 | King et al. |
| 5,088,521 A | 2/1992 | Johnson |
| 5,127,807 A | 7/1992 | Eslinger |
| 5,145,340 A | 9/1992 | Allard |
| 5,207,242 A | 5/1993 | Daghe et al. |
| 5,226,445 A | 7/1993 | Surjaatmadja |
| 5,230,363 A | 7/1993 | Winn, Jr. et al. |
| 5,253,987 A | 10/1993 | Harrison |
| 5,299,921 A | 4/1994 | Ritcher |
| 5,302,087 A | 4/1994 | Pacht |
| 5,362,215 A | 11/1994 | King |
| 5,370,148 A | 12/1994 | Shafer |
| 5,507,219 A | 4/1996 | Stogner |
| 5,524,902 A | 6/1996 | Cornette |
| 5,605,449 A | 2/1997 | Reed |
| 5,636,975 A | 6/1997 | Tiffany et al. |
| D383,053 S | 9/1997 | Schrader et al. |
| 5,848,880 A | 12/1998 | Helmig |
| 6,164,318 A | 12/2000 | Dixon |
| 6,167,959 B1 | 1/2001 | Bassinger et al. |
| 6,231,323 B1 | 5/2001 | Jezek |
| 6,257,626 B1 | 7/2001 | Campau |
| 6,382,940 B1 | 5/2002 | Blume |
| 6,419,459 B1 | 7/2002 | Sibbing |
| 6,544,012 B1 | 4/2003 | Blume |
| 6,641,112 B2 | 11/2003 | Antoff et al. |
| 6,910,871 B1 | 6/2005 | Blume |
| 7,140,211 B2 | 11/2006 | Tremblay |
| 7,168,440 B1 | 1/2007 | Blume |
| 7,186,097 B1 | 3/2007 | Blume |
| 7,290,560 B2 | 11/2007 | Orr et al. |
| 7,296,591 B2 | 11/2007 | Moe et al. |
| 7,335,002 B2 | 2/2008 | Vicars |
| 7,506,574 B2 | 3/2009 | Jensen et al. |
| 7,513,483 B1 | 4/2009 | Blume |
| 7,513,759 B1 | 4/2009 | Blume |
| 7,591,450 B1 | 9/2009 | Blume |
| D616,966 S | 6/2010 | Angell |
| 7,789,133 B2 | 9/2010 | McGuire |
| 7,828,053 B2 | 11/2010 | McGuire et al. |
| 7,845,413 B2 | 12/2010 | Shampine et al. |
| D631,142 S | 1/2011 | Angell |
| 7,866,346 B1 | 1/2011 | Walters |
| 7,963,502 B2 | 6/2011 | Lovell et al. |
| 8,083,504 B2 | 12/2011 | Williams et al. |
| 8,100,407 B2 | 1/2012 | Stanton et al. |
| 8,141,849 B1 | 3/2012 | Blume |
| 8,240,634 B2 | 8/2012 | Jarchau et al. |
| 8,317,498 B2 | 11/2012 | Gambier et al. |
| 8,360,094 B2 | 1/2013 | Steinbock et al. |
| 8,365,754 B2 | 2/2013 | Riley et al. |
| 8,528,462 B2 | 9/2013 | Pacht |
| 8,701,546 B2 | 4/2014 | Pacht |
| 9,010,412 B2 | 4/2015 | McGuire |
| D731,035 S | 6/2015 | Lo Cicero |
| D737,497 S | 8/2015 | Burgess et al. |
| 9,188,121 B1 | 11/2015 | Dille |
| D748,228 S | 1/2016 | Bayyouk et al. |
| 9,260,933 B2 | 2/2016 | Artherholt et al. |
| 9,291,274 B1 | 3/2016 | Blume |
| 9,328,745 B2 | 5/2016 | Bartlok et al. |
| 9,371,919 B2 | 6/2016 | Forrest et al. |
| 9,416,887 B2 | 8/2016 | Blume |
| 9,435,454 B2 | 9/2016 | Blume |
| 9,470,226 B2 | 10/2016 | Johnson et al. |
| 9,534,473 B2 | 1/2017 | Morris et al. |
| 9,631,739 B2 | 4/2017 | Belshan et al. |
| D787,029 S | 5/2017 | Bayyouk et al. |
| 9,670,922 B2 | 6/2017 | Pacht |
| 9,732,746 B2 | 8/2017 | Chandrasekaran et al. |
| 9,791,082 B2 | 10/2017 | Baxter et al. |
| 9,822,894 B2 | 11/2017 | Bayyouk et al. |
| D806,241 S | 12/2017 | Swinney et al. |
| 10,184,470 B2 | 1/2019 | Barnett, Jr. |
| 10,221,847 B2 | 3/2019 | Dyer |
| 10,240,597 B2 | 3/2019 | Bayyouk et al. |
| 10,352,321 B2 | 7/2019 | Byrne et al. |
| 10,393,113 B2 | 8/2019 | Wagner |
| 10,677,380 B1 | 6/2020 | Surjaatmadja et al. |
| 10,711,778 B2 | 7/2020 | Buckley |
| 10,760,567 B2 | 9/2020 | Salih et al. |
| 10,767,773 B2 | 9/2020 | Lee |
| 10,871,227 B1 | 12/2020 | Belshan et al. |
| 11,111,915 B2 | 9/2021 | Bayyouk et al. |
| 11,162,479 B2 | 11/2021 | Thomas |
| 11,261,863 B2 | 3/2022 | Beisel et al. |
| 2002/0166588 A1 | 11/2002 | Dean |
| 2004/0170507 A1 | 9/2004 | Vicars |
| 2004/0234404 A1 | 11/2004 | Vicars |
| 2006/0002806 A1 | 1/2006 | Baxter et al. |
| 2006/0027779 A1 | 2/2006 | McGuire et al. |
| 2008/0006089 A1 | 1/2008 | Adnan et al. |
| 2008/0008605 A1 | 1/2008 | Bauer et al. |
| 2008/0093361 A1 | 4/2008 | Kennedy et al. |
| 2008/0181798 A1 | 7/2008 | Folk |
| 2008/0279705 A1 | 11/2008 | Wago et al. |
| 2008/0279706 A1 | 11/2008 | Gambier et al. |
| 2009/0194717 A1 | 8/2009 | Jarchau et al. |
| 2010/0129249 A1 | 5/2010 | Bianchi et al. |
| 2010/0243255 A1 | 9/2010 | Luharuka et al. |
| 2011/0079302 A1 | 4/2011 | Hawes |
| 2011/0173814 A1 | 7/2011 | Patel |
| 2011/0189040 A1 | 8/2011 | Vicars |
| 2011/0206546 A1 | 8/2011 | Vicars |
| 2011/0206547 A1 | 8/2011 | Kim et al. |
| 2011/0236238 A1 | 9/2011 | Cordes et al. |
| 2012/0063936 A1 | 3/2012 | Baxter et al. |
| 2012/0141308 A1 | 6/2012 | Saini et al. |
| 2012/0187321 A1 | 7/2012 | Small |
| 2012/0272764 A1 | 11/2012 | Pendleton |
| 2013/0020521 A1 | 1/2013 | Byrne |
| 2013/0045123 A1 | 2/2013 | Roman et al. |
| 2013/0105175 A1 | 5/2013 | Mailand et al. |
| 2013/0112074 A1 | 5/2013 | Small |
| 2013/0202458 A1 | 8/2013 | Byrne et al. |
| 2013/0263932 A1 | 10/2013 | Baxter et al. |
| 2013/0319220 A1 | 12/2013 | Luharuka et al. |
| 2014/0127062 A1 | 5/2014 | Buckley et al. |
| 2014/0196570 A1 | 7/2014 | Small et al. |

(56) References Cited

U.S. PATENT DOCUMENTS

| | | |
|---|---|---|
| 2014/0196883 A1 | 7/2014 | Artherholt et al. |
| 2014/0348677 A1 | 11/2014 | Moeller et al. |
| 2015/0071803 A1 | 3/2015 | Huang |
| 2015/0084335 A1 | 3/2015 | Farrell et al. |
| 2015/0132152 A1 | 5/2015 | Lazzara |
| 2015/0132157 A1 | 5/2015 | Whaley et al. |
| 2015/0144826 A1 | 5/2015 | Bayyouk et al. |
| 2015/0147194 A1 | 5/2015 | Foote |
| 2015/0159647 A1 | 6/2015 | Dille |
| 2015/0211641 A1 | 7/2015 | Pacht |
| 2015/0219096 A1 | 8/2015 | Jain et al. |
| 2015/0300332 A1 | 10/2015 | Kotapish et al. |
| 2016/0025082 A1 | 1/2016 | Bryne et al. |
| 2016/0123313 A1 | 5/2016 | Simmons |
| 2016/0160848 A1 | 6/2016 | Toppings et al. |
| 2016/0281699 A1 | 9/2016 | Gnessin et al. |
| 2016/0369792 A1 | 12/2016 | Wagner |
| 2017/0002947 A1 | 1/2017 | Bayyouk et al. |
| 2017/0089473 A1 | 3/2017 | Nowell et al. |
| 2017/0204852 A1 | 7/2017 | Barnett, Jr. |
| 2017/0211565 A1 | 7/2017 | Morreale |
| 2017/0218951 A1 | 8/2017 | Graham et al. |
| 2018/0017173 A1 | 1/2018 | Nowell et al. |
| 2018/0045187 A1 | 2/2018 | Nagel et al. |
| 2018/0058447 A1 | 3/2018 | Foster |
| 2018/0313456 A1 | 11/2018 | Bayyouk et al. |
| 2019/0011051 A1 | 1/2019 | Yeung |
| 2019/0017503 A1 | 1/2019 | Foster et al. |
| 2019/0032685 A1 | 1/2019 | Foster et al. |
| 2019/0049052 A1 | 2/2019 | Shuck |
| 2019/0063427 A1 | 2/2019 | Nowell et al. |
| 2019/0120389 A1 | 4/2019 | Foster et al. |
| 2019/0128104 A1 | 5/2019 | Graham et al. |
| 2019/0136842 A1 | 5/2019 | Nowell et al. |
| 2019/0145391 A1 | 5/2019 | Davids |
| 2019/0277279 A1 | 9/2019 | Byrne et al. |
| 2019/0277341 A1 | 9/2019 | Byrne et al. |
| 2019/0368619 A1 | 12/2019 | Barnett et al. |
| 2020/0182240 A1 | 6/2020 | Nowell et al. |
| 2020/0191146 A1 | 6/2020 | Rinaldi et al. |
| 2020/0232455 A1 | 7/2020 | Blume |

FOREIGN PATENT DOCUMENTS

| | | |
|---|---|---|
| WO | 2014144113 A2 | 9/2014 |
| WO | 2015077001 A1 | 5/2015 |
| WO | 2017096488 A1 | 6/2017 |
| WO | 2017139348 A1 | 8/2017 |
| WO | 2018197458 A1 | 11/2018 |

VALVE BODY

SUMMARY

The present invention is directed to a valve configured to seal against a valve seat. The valve comprises a tapered sealing surface joined to an outer side surface by a recessed surface. The recessed surface forms a recess within the valve and comprises a plurality of straight-line segments: L1, L2, L3, and L4, and a plurality of radius segments: R1, R2, R3, and R4. L1 is positioned intermediate the tapered sealing surface and R1. L2 is positioned intermediate R1 and R2, L3 is positioned intermediate R2 and R3, and L4 is positioned intermediate R3 and R4. R4 is positioned intermediate L4 and the side surface. The valve further comprises a seal installed within the recess and engaging the plurality of straight-line segments and the plurality of radius segments. At least a portion of the tapered sealing surface and at least a portion of the seal are configured to seal against the valve seat.

The present invention is directed to a valve configured to seal against a valve seat. The valve comprises a tapered sealing surface joined to an outer side surface by a recessed surface. The recessed surface forms a recess within the valve and comprises a plurality of straight-line segments: L1, L2, and L3, and a plurality of radius segments: R1 and R2. L1 is positioned intermediate the tapered sealing surface and R1. L2 is positioned intermediate R1 and R2, and L3 is positioned intermediate R2 and the side surface. The valve further comprises a seal installed within the recess and engaging the plurality of straight-line segments and the plurality of radius segments. At least a portion of the tapered sealing surface and at least a portion of the seal are configured to seal against the valve seat.

DETAILED DESCRIPTION

Figure 1:
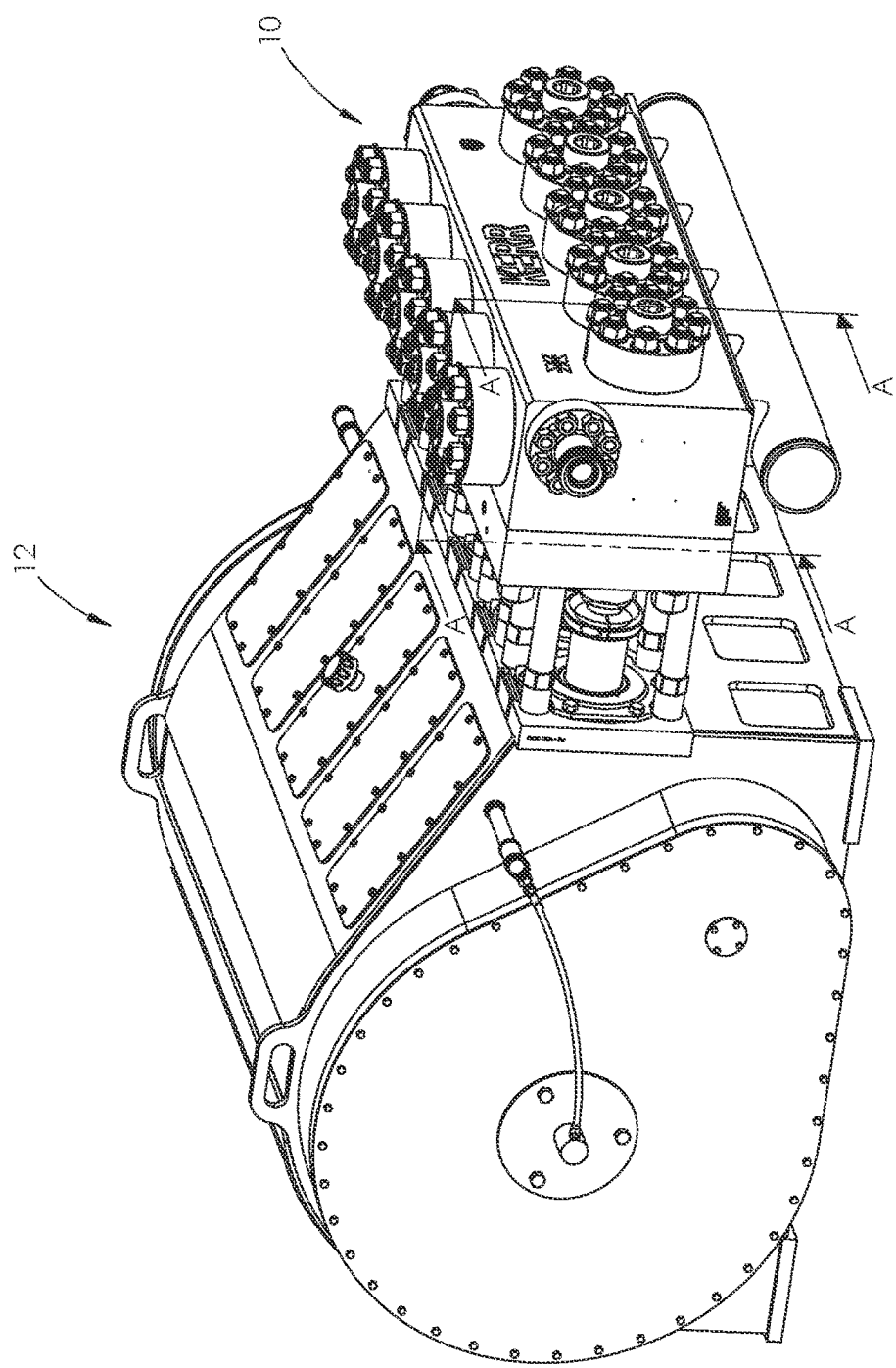
FIG. 1 is a perspective view of one embodiment of a fluid end attached to one embodiment of a power end.

With reference to FIG. 1, one embodiment of a fluid end 10 is shown attached to one embodiment of a power end 12. Fluid ends, like the fluid end 10, are used in oil and gas operations to deliver highly pressurized corrosive and/or abrasive fluids to piping leading to a wellbore. Power ends, like the power end 12, are configured to reciprocate plungers, like the plunger 14, shown in FIG. 2, within a fluid end to pump fluid throughout the fluid end. Fluid used in high pressure hydraulic fracturing operations is typically pumped through a fluid end at a minimum of 8,000 psi; however, fluid will normally be pumped through a fluid end at pressures around 10,000-15,000 psi during such operations, with spikes up to 22,500 psi.

Figure 2:
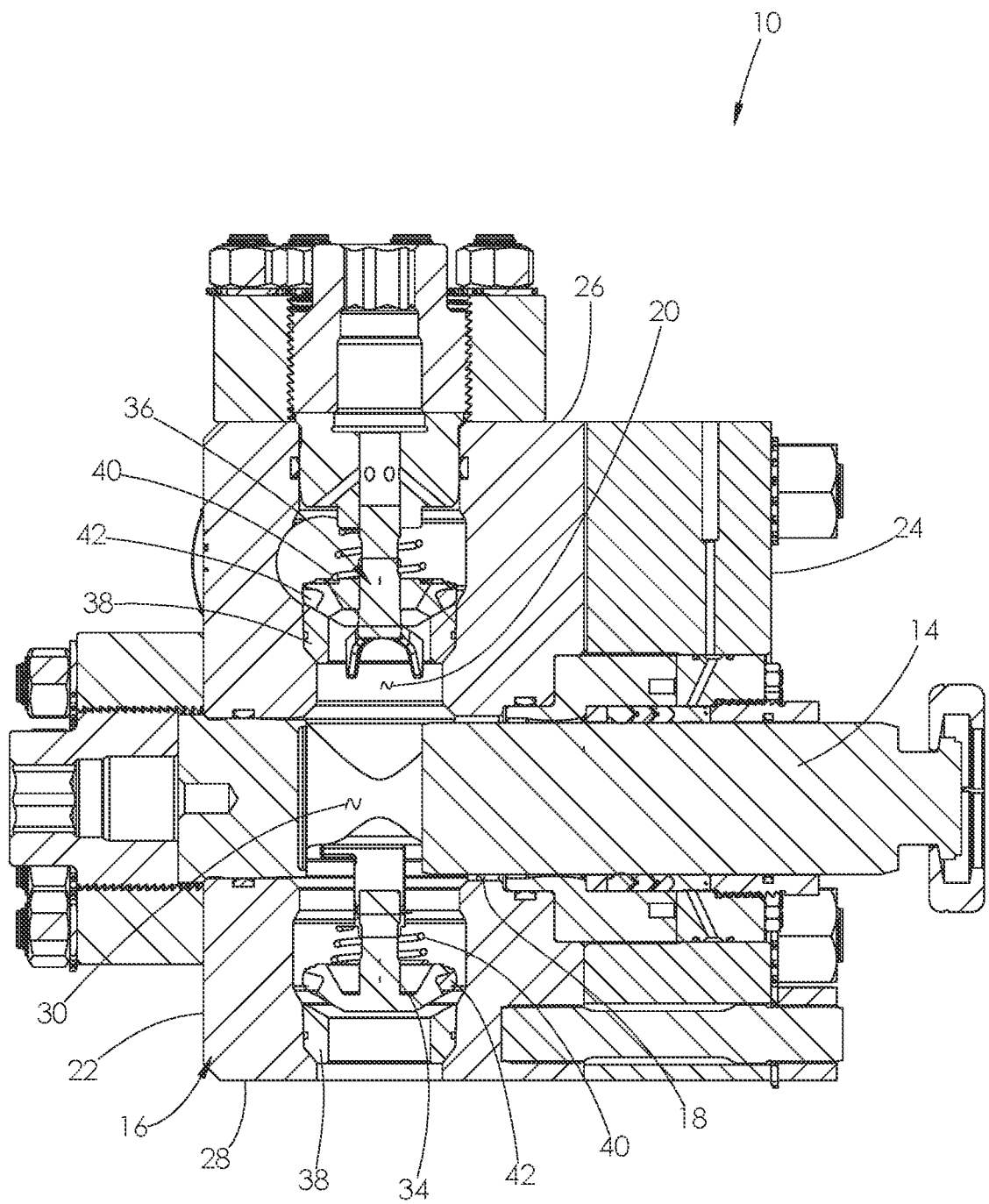
FIG. 2 is a cross-sectional view of the fluid end shown in FIG. 1, taken along line A-A.

With reference to FIG. 2, the fluid end 10 comprises a housing 16 having a horizontal bore 18 and a vertical bore 20 extending therethrough. The horizontal bore 18 opens on opposed front and rear surfaces 22 and 24 of the housing 16, and the vertical bore 20 opens on opposed upper and lower surfaces 26 and 28 of the housing 16. The bores 18 and 20 intersect to form an internal chamber 30. The plunger 14 is installed within the horizontal bore 18 through the opening on the rear surface 24. As the plunger 14 reciprocates, it pressurizes fluid contained within the internal chamber 30. A plurality of horizontal and vertical bore pairs 18 and 20 may be formed within a single fluid end housing 16.

Continuing with FIG. 2, fluid is routed throughout the housing 16 using an intake valve 34 and a discharge valve 36. The valves 34 and 36 are identical and configured to seal against a valve seat 38. The intake valve 34 and corresponding valve seat 38 are positioned below the internal chamber 30, and the discharge valve 36 and corresponding valve seat 38 are positioned above the internal chamber 30. During operation, the valves 34 and 36 move between open and closed positions. In the open position, the valve 34 or 36 is spaced from the valve seat 38, allowing fluid to flow around the valve 34 or 36. The intake valve 34 is shown in the open position in FIG. 2. In the closed position, the valve 34 or 36 seals against the valve seat 38, blocking fluid from passing around the valve 34 or 36. The discharge valve 36 is shown in the closed position in FIG. 2. The valves 34 and 36 are biased in a closed position by a spring 40 and moved to an open position by fluid pressure.

Continuing with FIG. 2, the valves 34 and 36 each comprise a seal 42. When the valve 34 or 36 is in a closed position, the seal 42 is compressed against the valve seat 38, forming a tight seal. Seals used with valves, like the valves 34 or 36, are typically made of urethane and molded to the valve body. In traditional fluid ends, the high fluid pressure within the fluid end has been known to wear and erode the area of the seal contacting the valve seat. Such erosion will cause the valve to fail to seal properly, allowing fluid to leak around the valve. The seal is also known to shear or separate from the valve body, allowing fluid to leak around the valve. This leakage reduces the maximum pressure and flow capabilities of the fluid end. Once the valve fails, it will need to be replaced to ensure proper function of the fluid end. The operation of a fluid end must be stopped in order to replace a valve, costing valuable production time and money.

The present disclosure describes a plurality of different embodiments of valves, including the valves 34 and 36 shown in FIG. 2. The various embodiments of valves described herein are each designed to reduce wear and erosion to the valve over time, as well as prevent the seal from shearing or separating from the valve body. Such advantages extend the life of the valves disclosed herein as compared to traditional valves. Extending the life of a valve extends production time between valve replacements, saving valuable time and money.

Even if not specifically shown in the figures herein, the various embodiments of valves described herein may be configured as leg-guided valves, like the valves 34 and 36 shown in FIG. 2. In alternative embodiments, the various embodiment of valves described herein may be configured as stem-guided valves, like intake and discharge valves 41 and 44, shown in FIG. 3. In further alternative embodiments, the various embodiments of valves described herein may be configured for use in different embodiments of fluid ends, such as the fluid end 50, shown in FIGS. 4 and 5.

Figure 4:
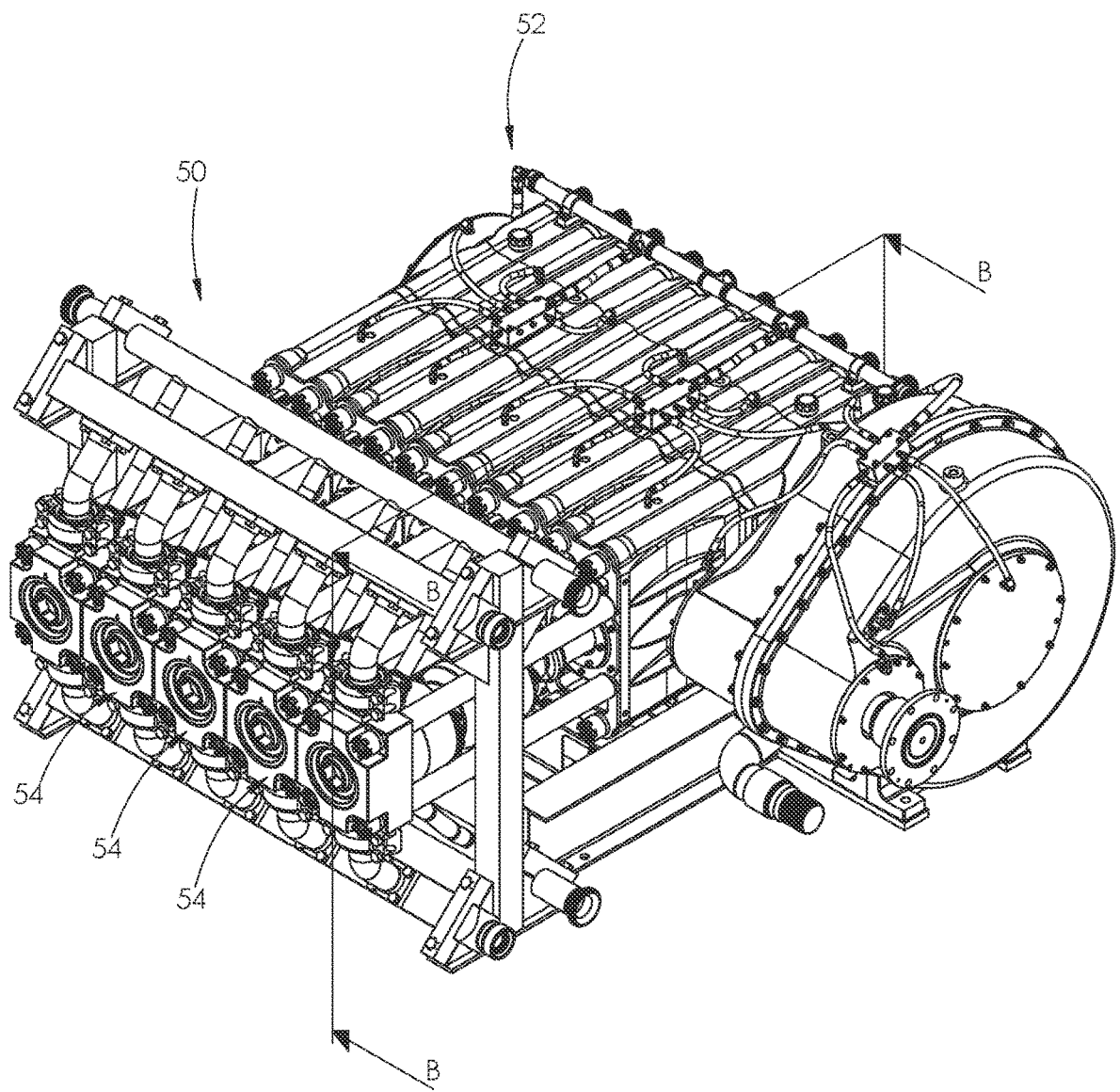
FIG. 4 is a perspective view of another embodiment of a fluid end attached to another embodiment of a power end.
Figure 5:
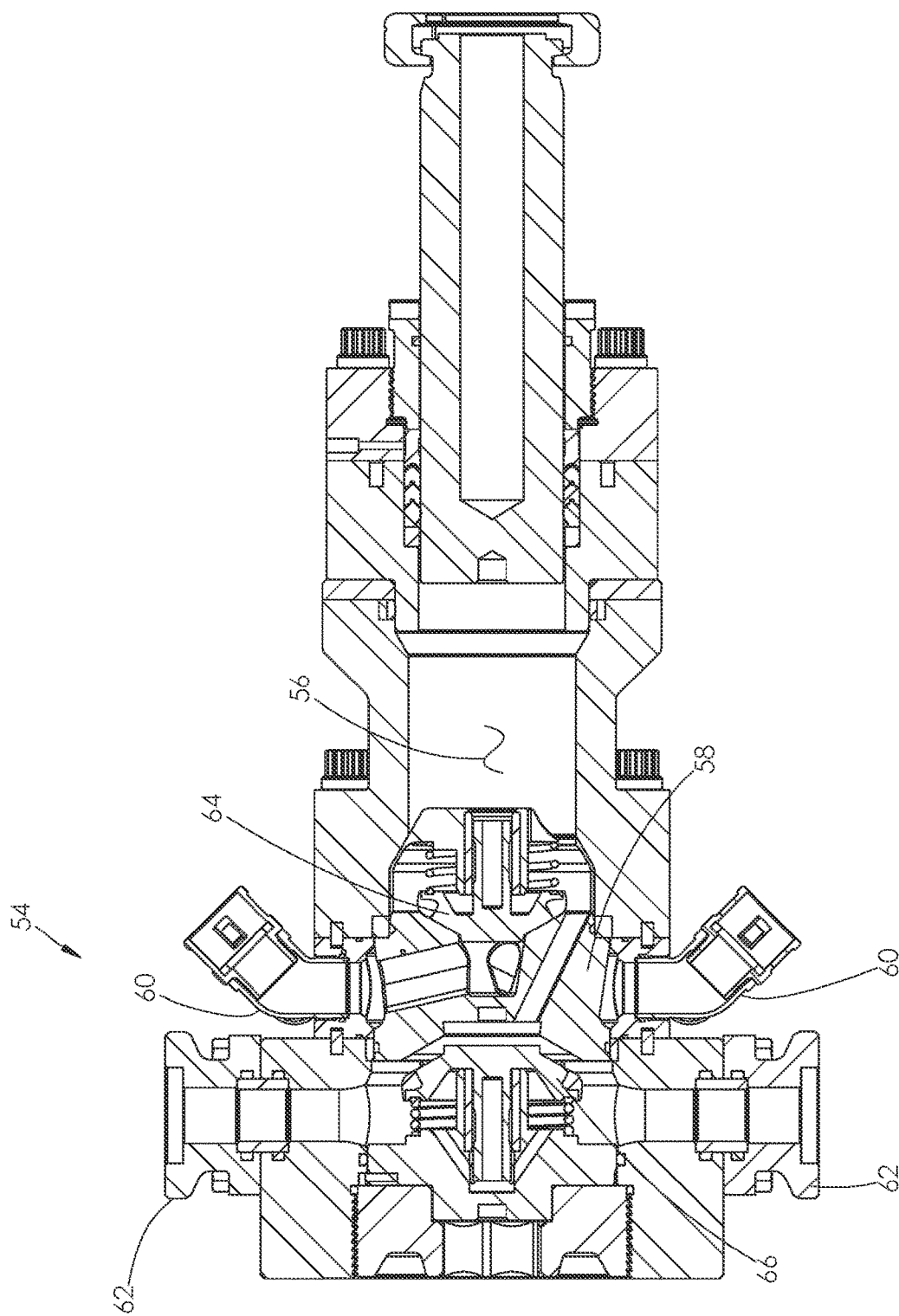
FIG. 5 is a cross-sectional view of the fluid end shown in FIG. 4, taken along line B-B.
Figure 6:
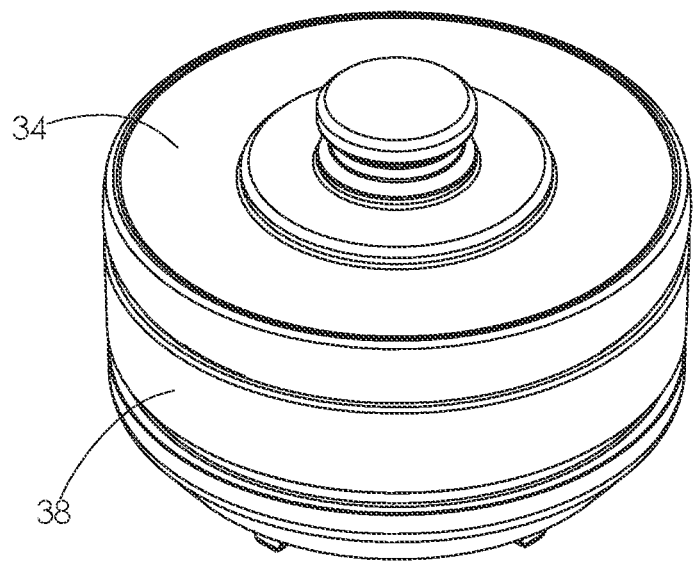
FIG. 6 is a top perspective view of the intake valve and valve seat shown installed within the fluid end in FIG. 2. The valve is shown in a closed position.
Figure 7:
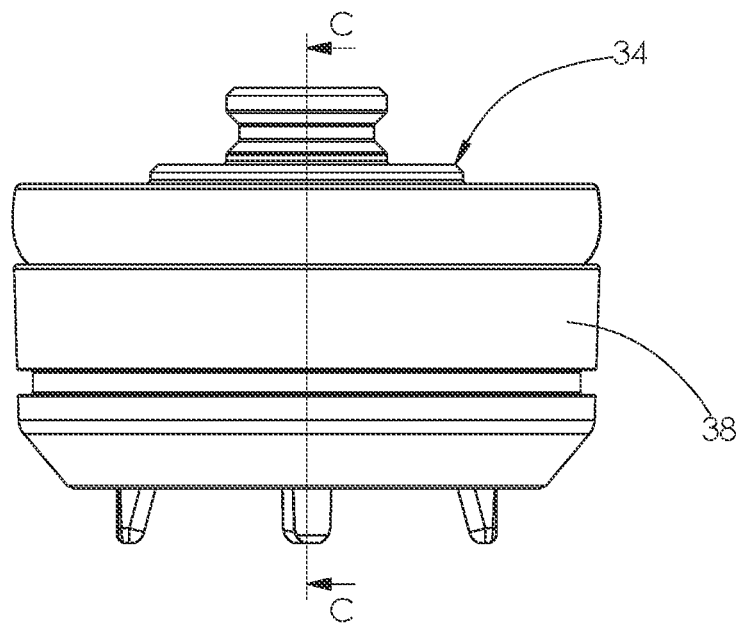
FIG. 7 is a side elevational view of the valve and valve seat shown in FIG. 6.
Figure 8:
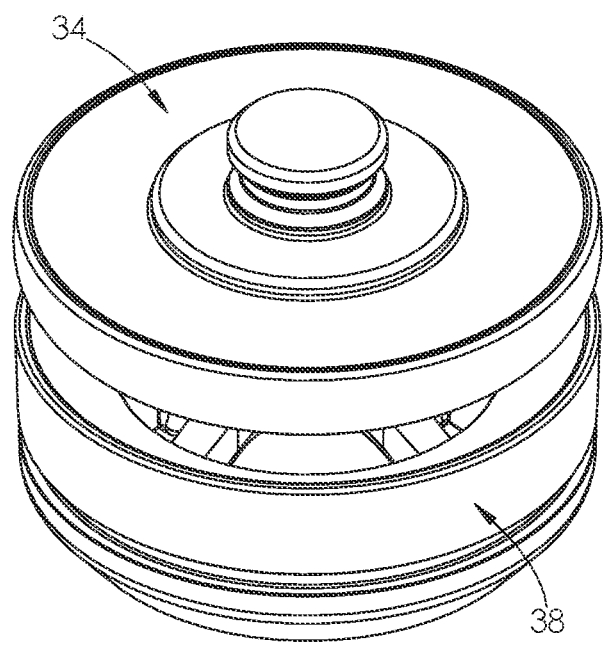
FIG. 8 is the top perspective view of the intake valve and valve seat shown in FIG. 6, but the valve is shown in an open position.
Figure 9:
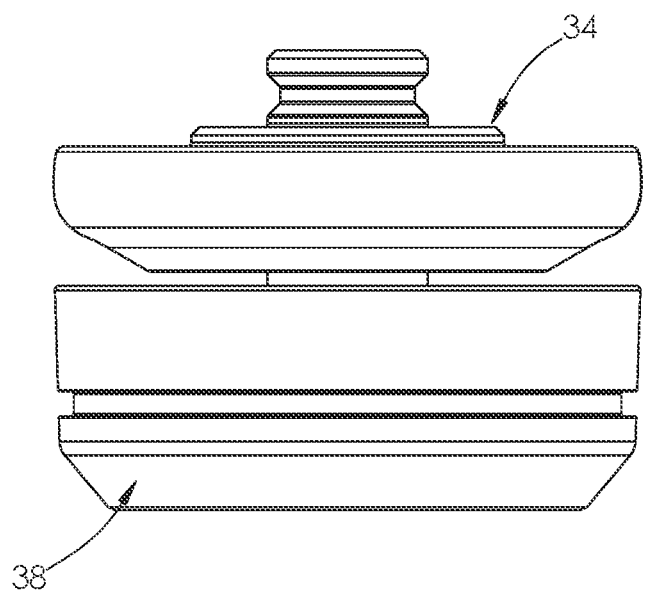
FIG. 9 is a side elevational view of the valve and valve seat shown in FIG. 8.

With reference to FIGS. 4 and 5, the fluid end 50 is shown attached to another embodiment of a power end 52. In contrast to the fluid end 10, the fluid end 50 comprises a plurality of fluid end sections 54 positioned in a side-by-side relationship. Each fluid end section 54 has a single horizontal bore 56 formed therein, as shown in FIG. 5. Fluid is routed throughout the horizontal bore 56 using a fluid routing plug 58. Fluid enters the horizontal bore 56 through one or more intake or suction conduits 60 and discharges from the horizontal bore 56 through one or more discharge conduits 62, as shown in FIG. 5.

Continuing with FIG. 5, fluid flow throughout the fluid routing plug 58 is controlled by an intake or suction valve 64 and a discharge valve 66. The valves 64 and 66 engage opposite sides of the fluid routing plug 58 such that the fluid routing plug 58 functions as a valve seat. The valves 64 and 66 shown in FIG. 5 are stem-guided valves, like the valves 41 and 44 shown in FIG. 3. The valves 64 and 66 are generally identical to the valves 41 and 44 but may vary in size. The fluid end 50 is described in more detail in U.S. patent application Ser. No. 17/884,712, authored by Cole et al., the entire contents of which are incorporated herein by reference.

Turning to FIGS. 6-15, the valve 34 is shown in more detail. Because the valves 34 and 36 are identical, only the valve 34 will be described in detail herein. The valve 34 is shown in the closed position, engaging the valve seat 38 in FIGS. 6 and 7, and is shown in the open position, spaced from the valve seat 38 in FIGS. 8 and 9.

Figure 10:
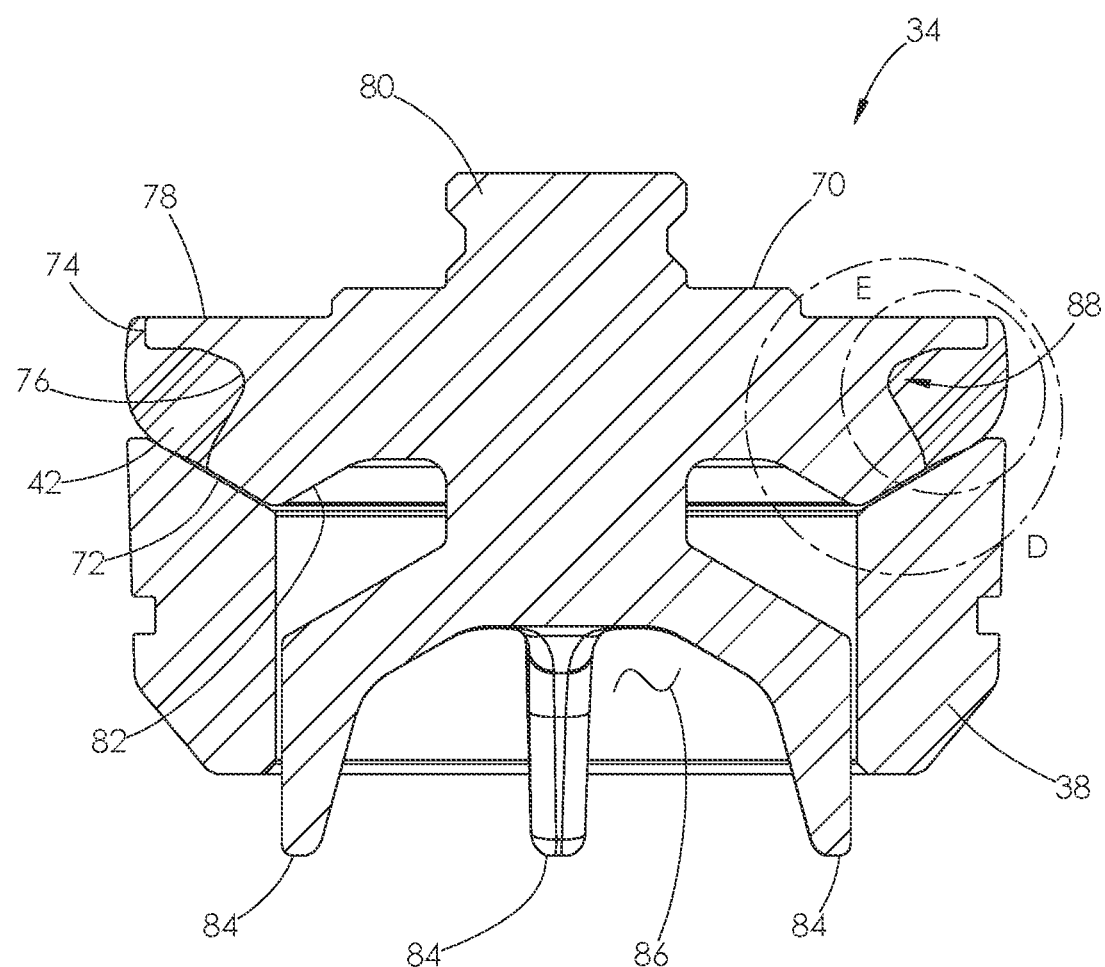
FIG. 10 is a cross-sectional view of the valve and valve seat shown in FIG. 7, taken along line C-C, but the valve is not in a fully closed position.

Continuing with FIG. 10, the valve 34 comprises a valve body 70 having a tapered sealing surface 72 joined to a side surface 74 by a recessed surface 76. The side surface 74 is further joined to an upper surface 78 of the valve body 70. A nose 80 projects from the upper surface 78 and is configured to engage the spring 40, as shown in FIG. 2. The tapered sealing surface 72 is further joined to a lower surface 82 of the valve body 70. A plurality of legs 84 extend from the lower surface 82 in a downward direction. The plurality of legs 84 are configured to center the valve 34 within a flow passage 86 formed in the valve seat 38. The legs 84 ensure the valve 34 is properly aligned with the valve seat 38 during operation.

Figure 11:
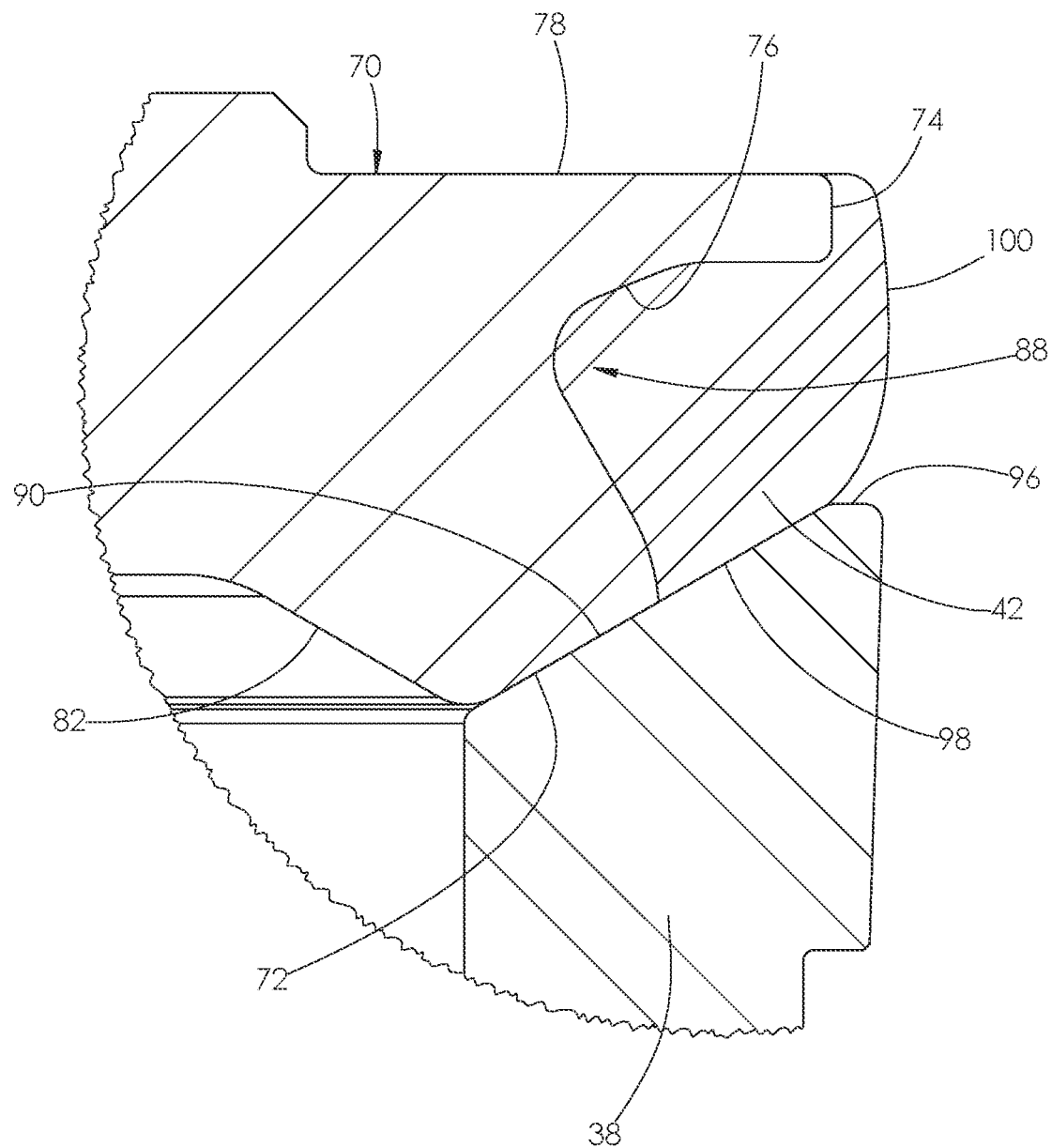
FIG. 11 is an enlarged view of area D shown in FIG. 10, but the valve is shown in a fully closed position.

Continuing with FIGS. 10 and 11, the recessed surface 76 forms a recess 88 within the valve body 70. The seal 42 is installed within the recess 88 and engages the recessed surface 76. As mentioned, the seal 42 is made of urethane and molded to the valve body 70 to form the valve 34. When the valve 34 is in the closed position, the tapered sealing surface 72 and a portion of the seal 42 engage a tapered strike face 90 formed at the top of the valve seat 38, as shown in FIG. 11.

Figure 12:
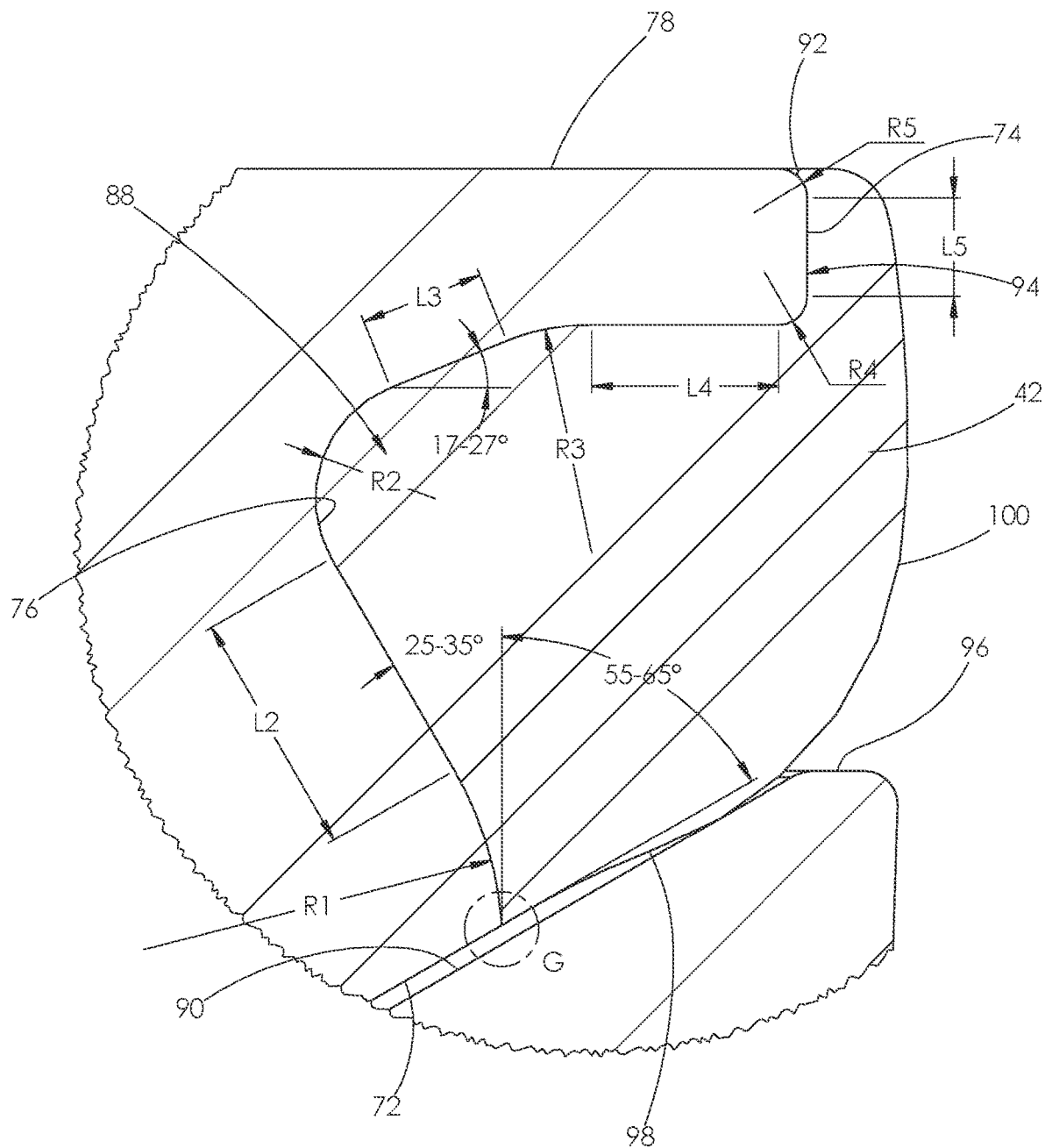
FIG. 12 is an enlarged view of area E shown in FIG. 10.
Figure 13:
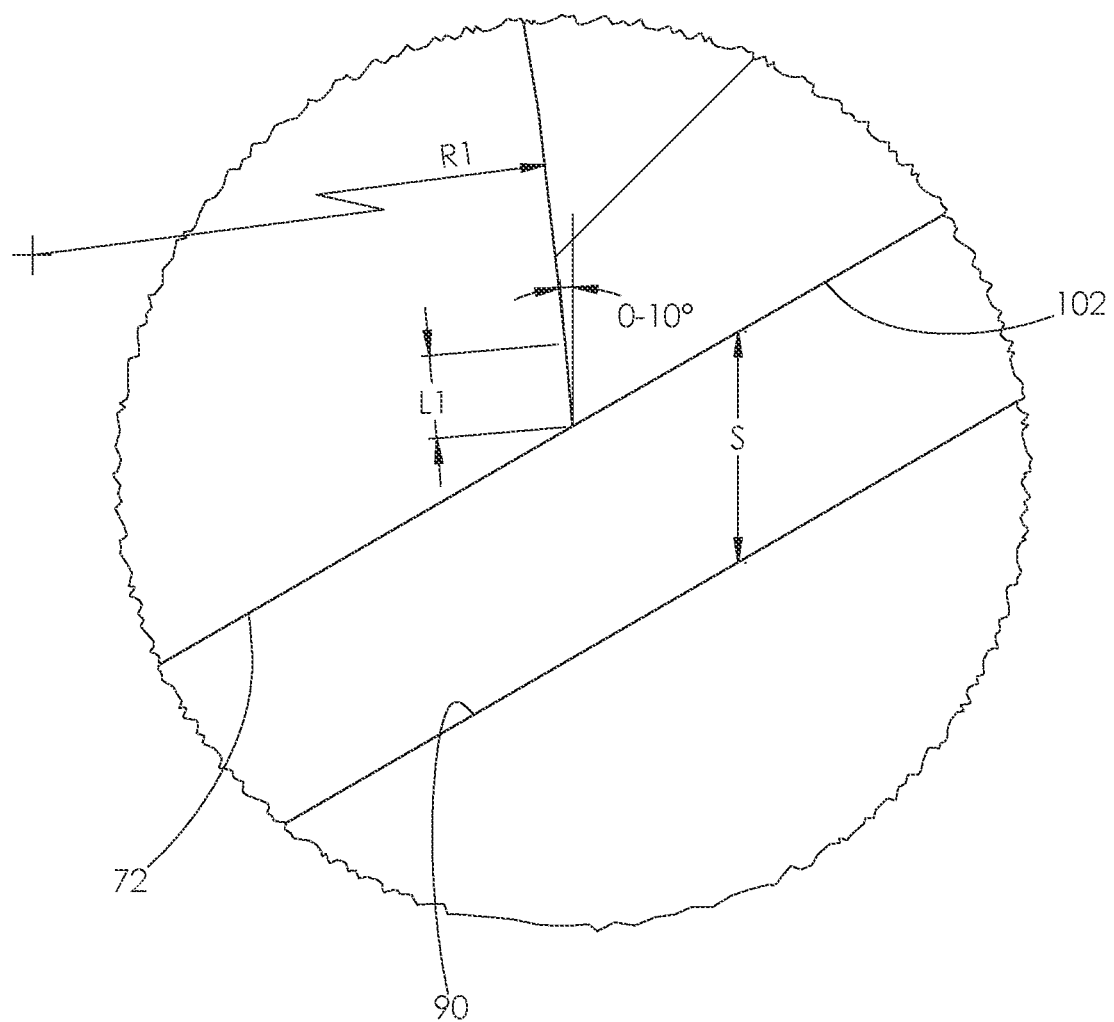
FIG. 13 is an enlarged view of area G shown in FIG. 12.

Turning to FIGS. 12 and 13, a profile of the recessed surface 76 comprises a plurality of straight-line segments and a plurality of radius segments. The straight-line segments comprise: L1, L2, L3, and L4. The radius segments comprise: R1, R2, R3, and R4. L1 starts at the end of the tapered sealing surface 72 as shown in FIG. 13. L1 extends a short distance and transitions into R1. R1 transitions into L2, L2 transitions into R2, R2 transitions in L3, L3 transitions into R3, R3 transitions into L4, and L4 transitions into R4, as shown in FIG. 12. R4 transitions into the side surface 74. Put another way, L1 is positioned intermediate the tapered sealing surface 72 and R1, L2 is positioned intermediate R1 and R2, L3 is positioned intermediate R2 and R3, L4 is positioned intermediate R3 and R4, and R4 is positioned intermediate L4 and the side surface 74.

Continuing with FIGS. 12 and 13, L1 extends at a 0-10-degree angle counterclockwise from vertical, preferably 5-degrees, as shown in FIG. 13. L2 may be at a 25-35-degree angle counterclockwise from vertical, preferably 30-degrees, as shown in FIG. 12. L3 may be at a 17-27-degree angle counterclockwise from horizontal, preferably 22-degrees, and L4 is generally horizontal, as shown in FIG. 12. While the specific values of L1, L2, L3, and L4 may vary depending on the size of the valve 34, the relationship between the plurality of line segments are preferably: L2>L4>L3>L1. Likewise, while the specific values of R1, R2, R3, and R4 may vary depending on the size of the valve 34, the relationship between the plurality of radius segments are preferably: R1>R3>R2>R4.

Continuing with FIG. 12, the side surface 74 comprises a straight-line segment, L5 and a radius segment, R5. L5 is generally vertical and is positioned intermediate R4 and R5. R5 transitions into the upper surface 78. L5 is preferably less than L3, but greater than L1. R5 is generally equal in size to R4. The seal 42 is installed within the recess 88 such that the seal 42 engages L1, L2, L3, L4, L5, R1, R2, R3, R4, and R5. When installed therein, the seal 42 covers the side surface 74 and an edge 92 of the seal 42 meets the upper surface 78 of the valve body 70.

Continuing with FIG. 12, the combination of the plurality of straight-line segments and the plurality of radius segments forms a double dovetail with the seal 42 when the seal 42 is installed within the recess 88. Such configuration helps retain the seal 42 within the recess 88 as well as transfers high stress areas of the seal 42 to areas better suited to withstand high stress during operation. The configuration of L4, R4, L5, and R5 forms a flange 94 at the upper end of the valve body 70. The horizontal orientation of the flange 94 further aids in keeping the seal 42 contained within the recess 88 during operation. The flange 94 also forces the seal 42 in a specific direction rather than allowing the pressure imposed on the seal 42 by the valve seat 38 to dictate the seal's movement when compressed. Forcing the seal 42 in a specific direction helps prevent the seal 42 from wrapping around an edge 96 of the valve seat 38 during operation. Such action is known to cause damage to traditional seals.

Figure 14:
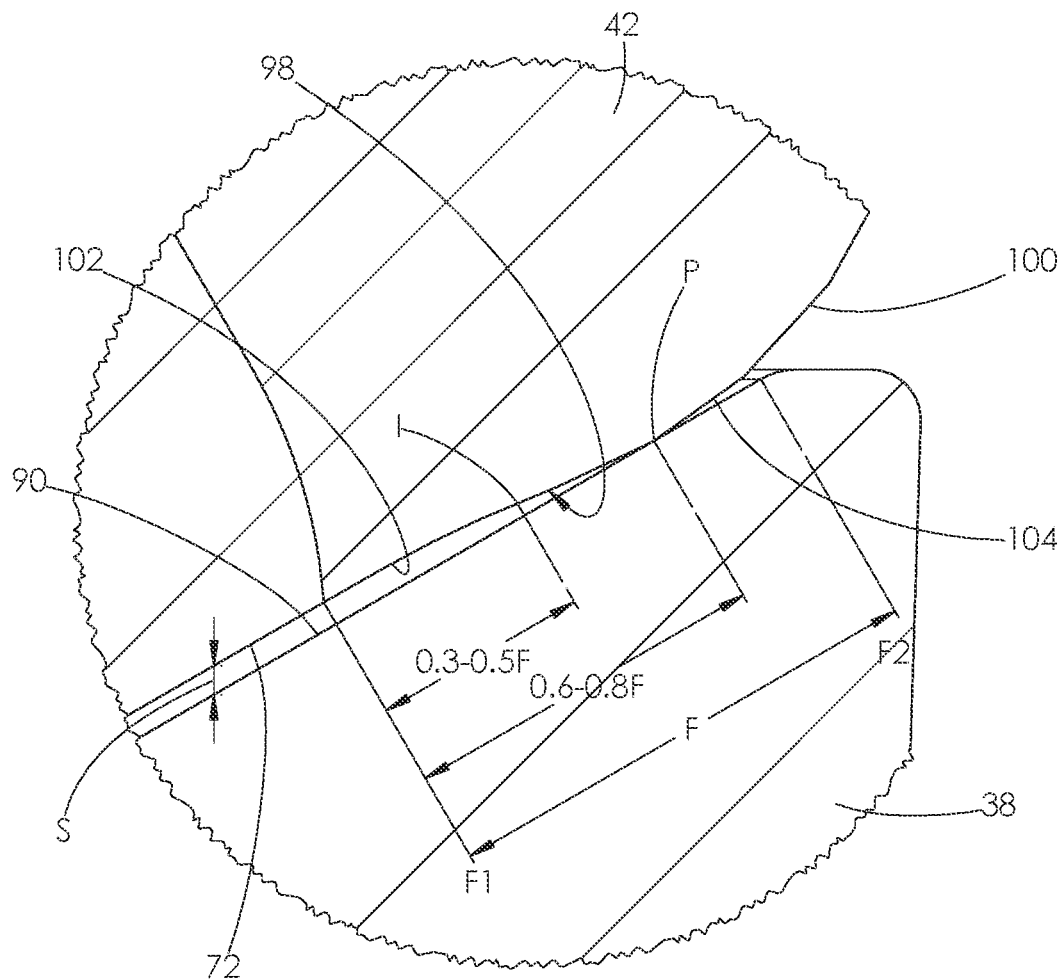
FIG. 14 is an enlarged view of area J shown in FIG. 15.

With reference to FIGS. 11 and 14, the seal 42 comprises a strike face 98 joined to an outer face 100. The strike face 98 engages the valve seat 38 in addition to the tapered sealing surface 72 during operation, as shown in FIG. 11. The strike face 98 comprises a first section 102 joined to a second section 104, as shown in FIG. 14. The first section 102 contacts the tapered sealing surface 72 while the second section 104 transitions into the outer face 100.

Continuing with FIG. 14, in traditional valves, the strike face of the seal is generally coplanar with the tapered sealing surface of the valve body. In the valve 34, the first section 102 is coplanar with the tapered sealing surface 72 at the point of direct contact with the tapered sealing surface 72, but transitions to have a concave shape. The first section 102 of the strike face 98 transitions into the second section 104 of the strike face 98 at an inflection point, I. The second section 104 has a convex shape and extends vertically downwards past the plane containing the tapered sealing surface 72 to a point, P. When the valve 34 moves from an open to a closed position, point P contacts the tapered strike face 90 of the valve seat 38 before the rest of the seal strike face 98 and the tapered sealing surface 72.

With reference to FIGS. 13 and 14, upon contact of point P with the strike face 98 of the valve seat 38, a space or standoff, S exists between the tapered strike face 90 and the first section 102 of the seal 42, as shown in FIG. 13. The standoff, S may be in the range of 0.015 to 0.035 inches. The standoff, S creates a cushion, slowing the valve 34 down before the entirety of the seal strike face 98 and the tapered sealing surface 72 impact valve seat 38. Such action helps to decrease wear on the seal 42 and the tapered sealing surface 72 during operation, thereby increasing the life of the valve 34.

Continuing with FIG. 14, a profile of the area of contact between the strike face 98 of the seal 42 and the tapered strike face 90 of the valve seat 38 has a length, F. F starts at F1, which is a point that aligns with the point of contact between the tapered sealing surface 72 and the first section 102 of the strike face 98. F ends at F2, which is a point that aligns with the end of the second section 104 of the strike face 98 or the point where the second section 104 transitions into the outer face 100 of the seal 42.

Point, P may be positioned anywhere between 60-80% of the total length of F, measured from F1. Preferably, point, P is located at 74% of the total length of F. For example, if F is 0.430 inches, point, P will be located anywhere between 0.258-0.344 inches or 0.6F-0.8F, along F. Preferably the distance is 0.218 inches, or 0.74F. The inflection point, I may be located anywhere between 30-50% of the total length of F, measured from F1. For example, if F is 0.430 inches, the inflection point, I is located anywhere between 0.129-0.215 inches or 0.3F-0.5F.

Turning back to FIGS. 11 and 12, the strike face 98 and the outer face 100 of the seal 42 are formed as one continuous curve. There are no straight sections. This gradual curve provides a smoother, less turbulent fluid flow around the seal 42 with lower velocities. The continuous curve of the outer face 100 also prevents the seal 42 from wrapping around the edge 96 of the valve seat 38 during operation. The one continuous curve may be a splined curve. In alternative embodiments, the one continuous curve may be other types of curves known in the art as long as there are no straight sections in the curve. Because the outer face 100 is shaped from one continuous curve, the outer face 100 does not include any bulbous protrusions or channels, like those shown in U.S. Pat. No. 9,631,739, issued to Belshan, and U.S. Pat. No. 10,221,848 and 11,111,915, both issued to Bayyouk.

Figure 15:
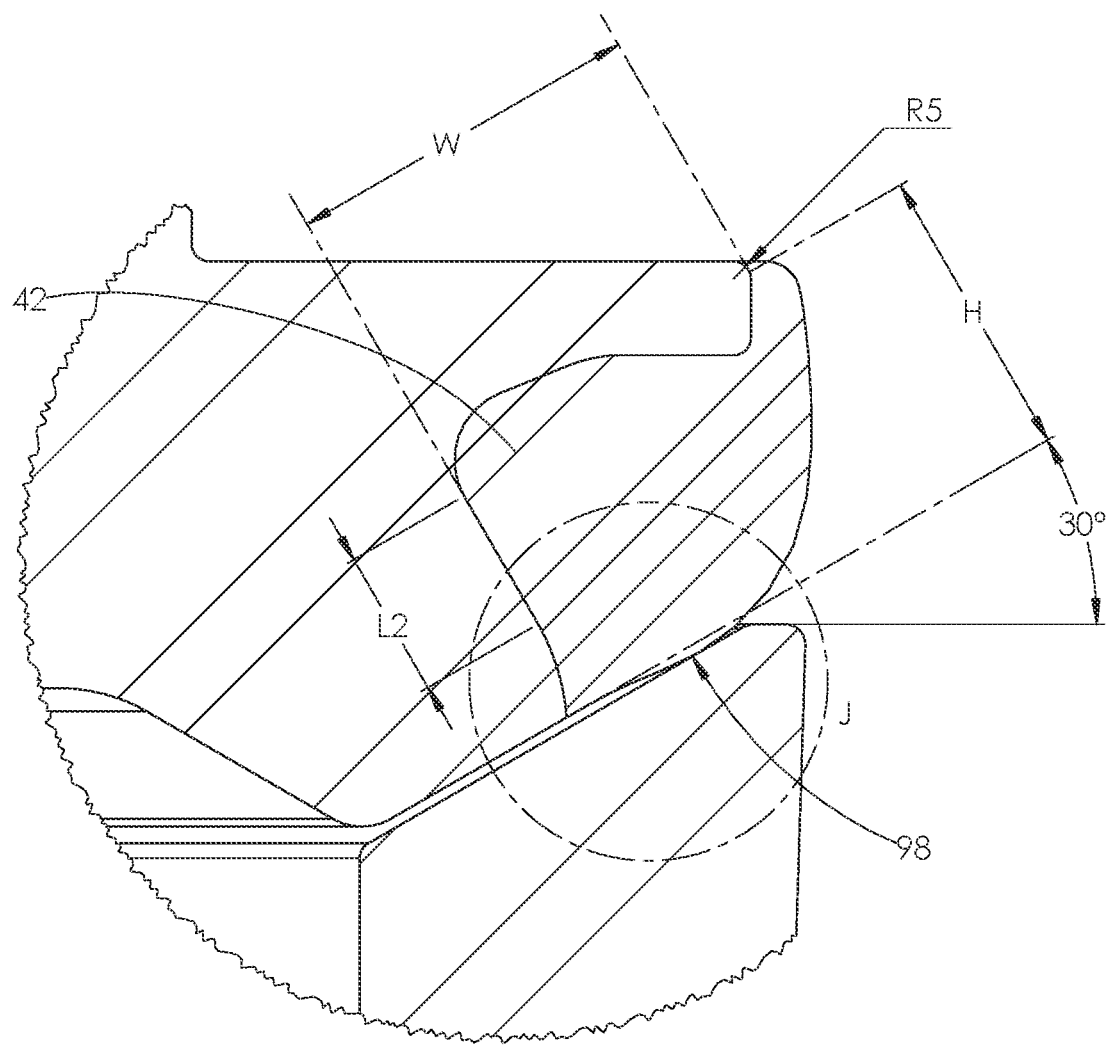
FIG. 15 is an enlarged view of area D shown in FIG. 10.
Figure 16:
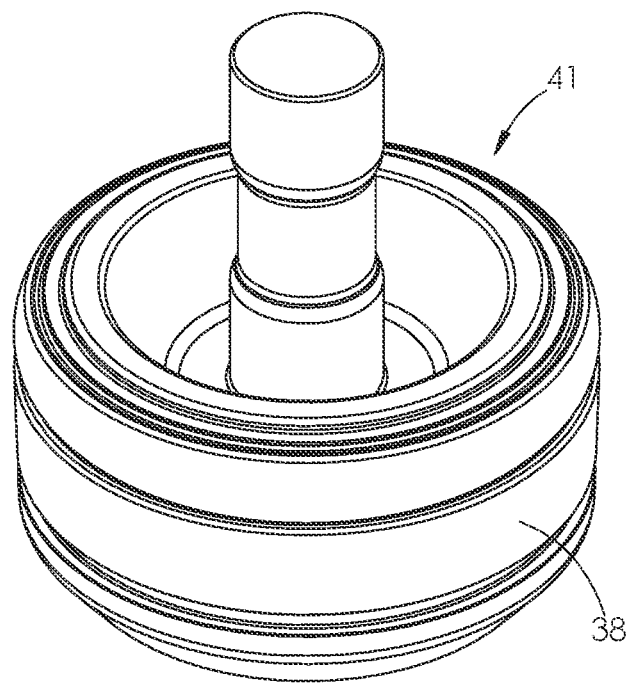
FIG. 16 is a top perspective view of the intake valve and valve seat shown installed within the fluid end in FIG. 3. The valve is shown in a closed position.
Figure 17:
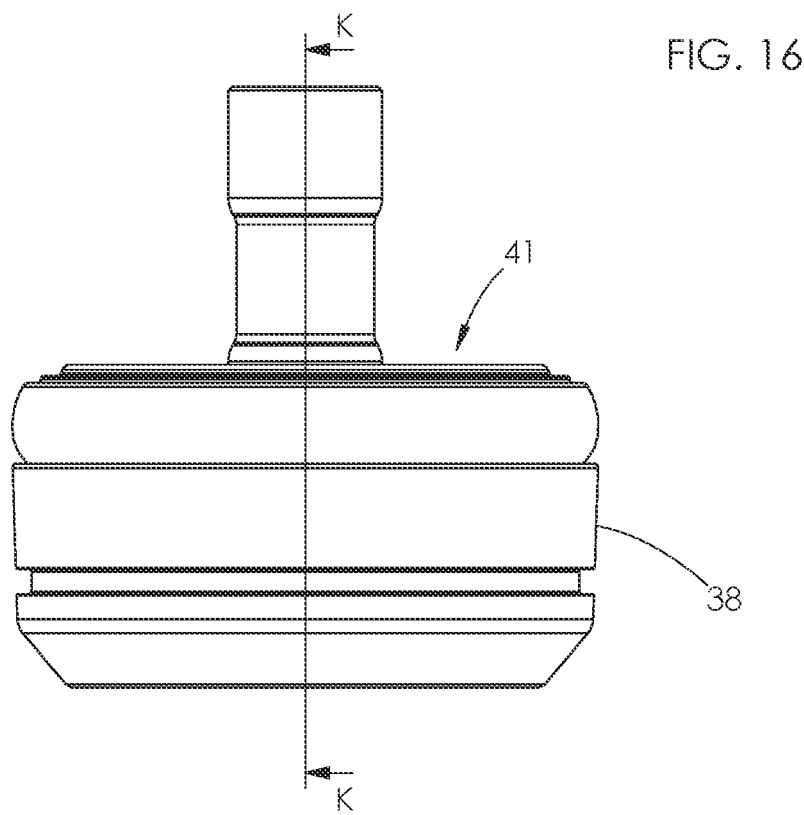
FIG. 17 is a side elevational view of the valve and valve seat shown in FIG. 16.

Turning to FIG. 15, the height, H of the seal 42 is measured perpendicular from the strike face 98 to the maximum diametric extension of radius segment, R5. The width, W of the seal 42 is measured from straight-line segment, L2 to the same maximum diametric extension of radius segment, R5. The ratio of the height, H of the seal 42 to the width, W of the seal 42, H:W, may range from 4.5:6 to 5.5:6. Preferably, the ratio is 5:6. Such ratio has been found to optimally reduce stress and strain on the seal 42 during operation.

Figure 3:
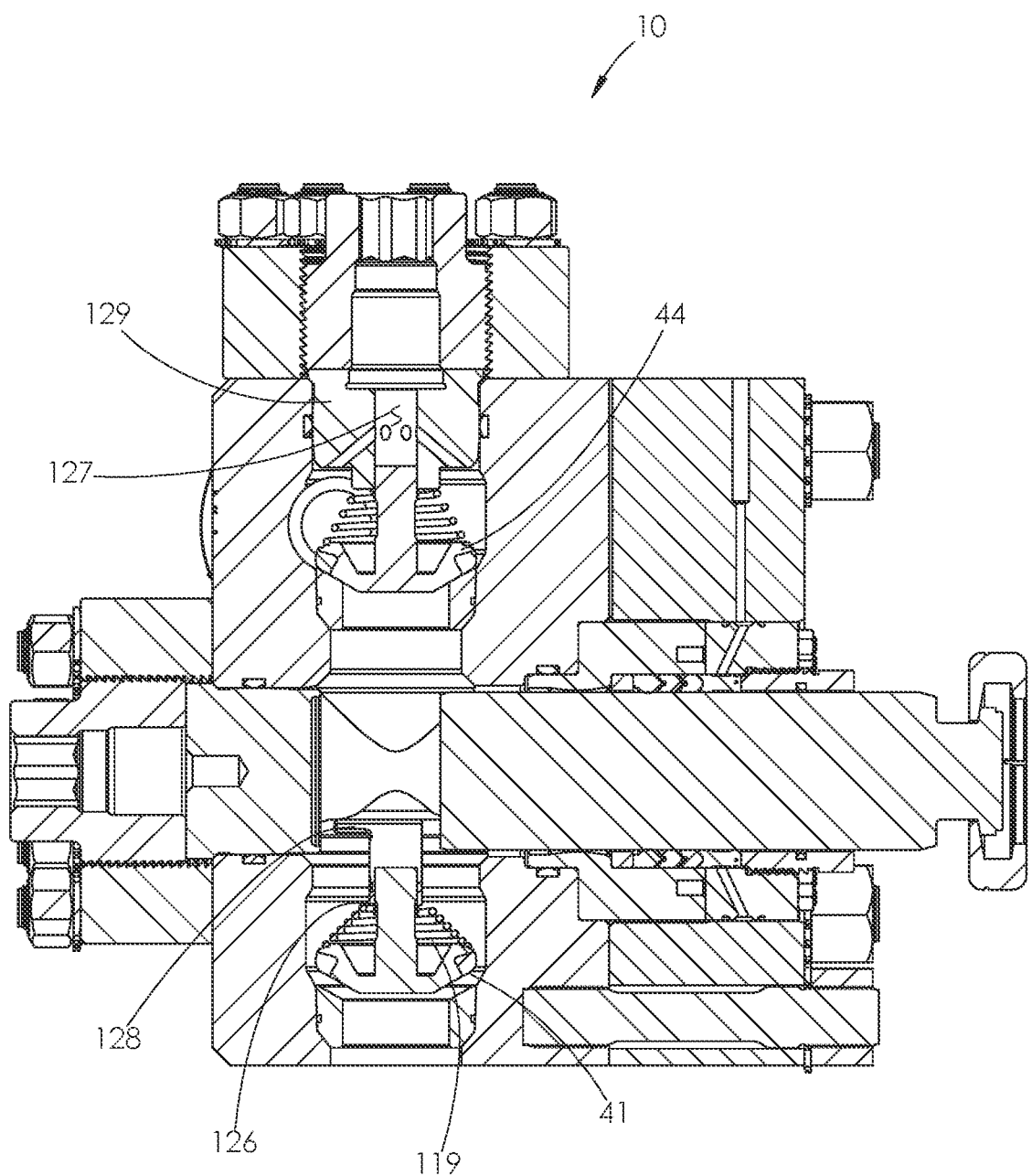
FIG. 3 is the cross-sectional view shown in FIG. 2, but another embodiment of an intake and a discharge valve are installed therein.

With reference to FIGS. 16-22, the intake valve 41 shown in FIG. 3 is shown in more detail. The intake valve 41 is identical to the discharge valve 44 so only the valve 41 will be described in more detail herein. The valve 41 comprises a valve body 112 having a tapered sealing surface 114 joined to a side surface 116 by a recessed surface 118. The side surface 116 is further joined to an upper surface 120 of the valve body 112. The tapered sealing surface 114 is further joined to a lower surface 122 of the valve body 112.

Figure 18:
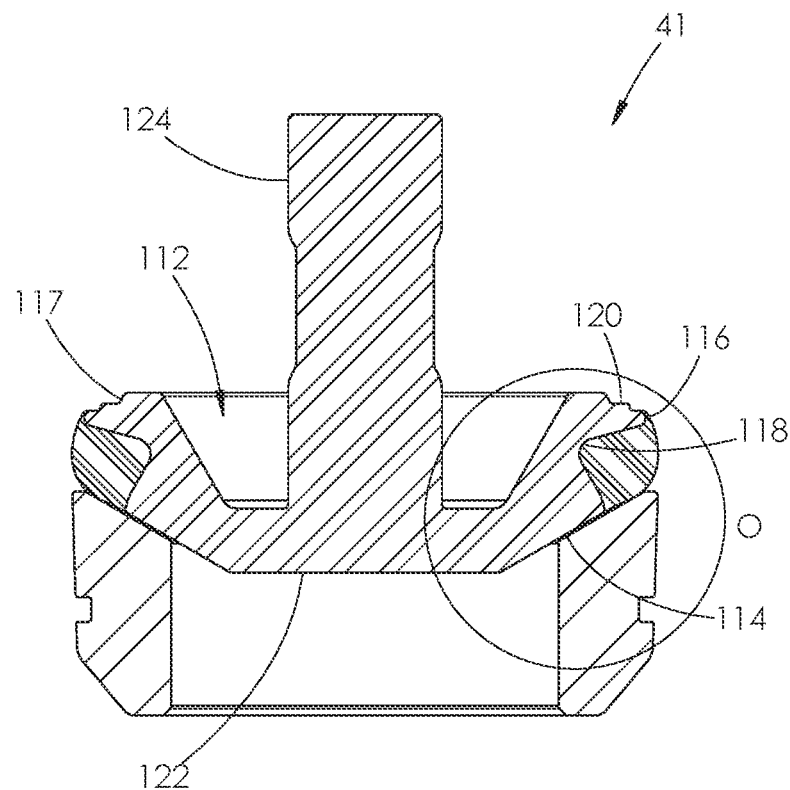
FIG. 18 is a cross-sectional view of the valve and valve seat shown in FIG. 17, taken along line K-K.
Figure 19:
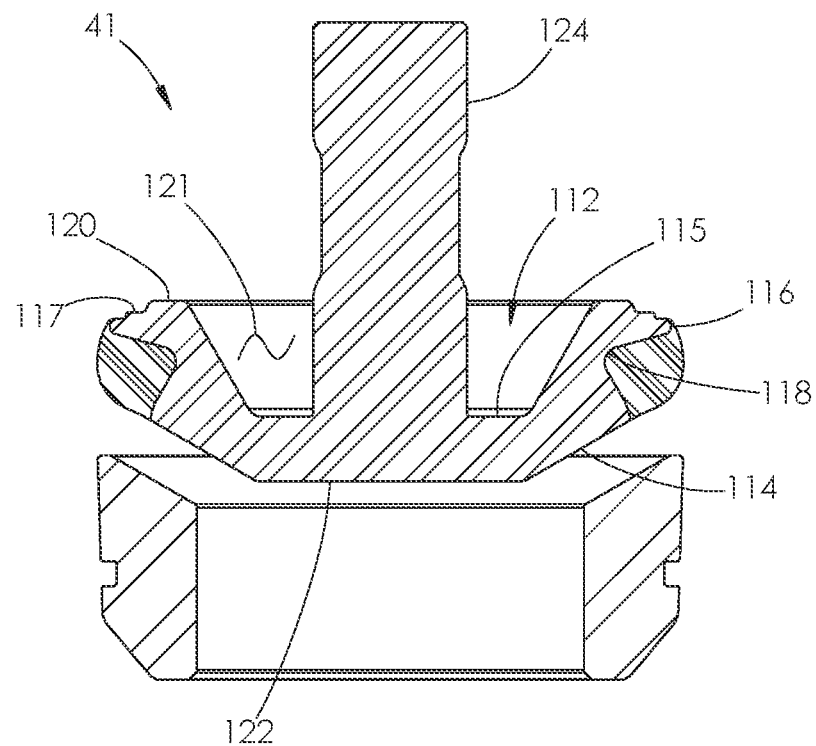
FIG. 19 is the cross-sectional view of the valve and valve seat shown in FIG. 18, but the valve is shown in an open position.

Continuing with FIGS. 18 and 19, in contrast to the valve 34, the lower surface 122 of the valve 41 does not include any legs for centering the valve 41 on the valve seat 38. Instead, a stem 124 projects from the upper surface 120 of the valve 41 and is configured to reciprocate within a bore 126 formed within a valve retainer 128, as shown in FIG. 3. The combination of the stem 124 and valve retainer 128 maintains the valve 41 in proper alignment on the valve seat 38 during operation. In the case of the discharge valve 44, the stem 124 reciprocates within a bore 127 formed in a discharge plug 129, as shown in FIG. 3.

Continuing with FIGS. 18 and 19, the upper surface 120 of the valve 41 comprises an outer rim 117 joined to a base 115. A spring 119 used with the valve 41 engages the valve 41 on the outer rim 117, as shown in FIG. 3. The spring 119 has a conical shape in order to extend between the outer rim 117 and the valve retainer 128 or discharge plug 129. The stem 124 projects from the base 115 of the upper surface 120. The outer rim 117 and the base 115 are shaped such that an annular void 121 surrounds a portion of the stem 124. The annular void 121 reduces the weight of the valve 41 and helps orient the valve's center of gravity during operation.

Figure 20:
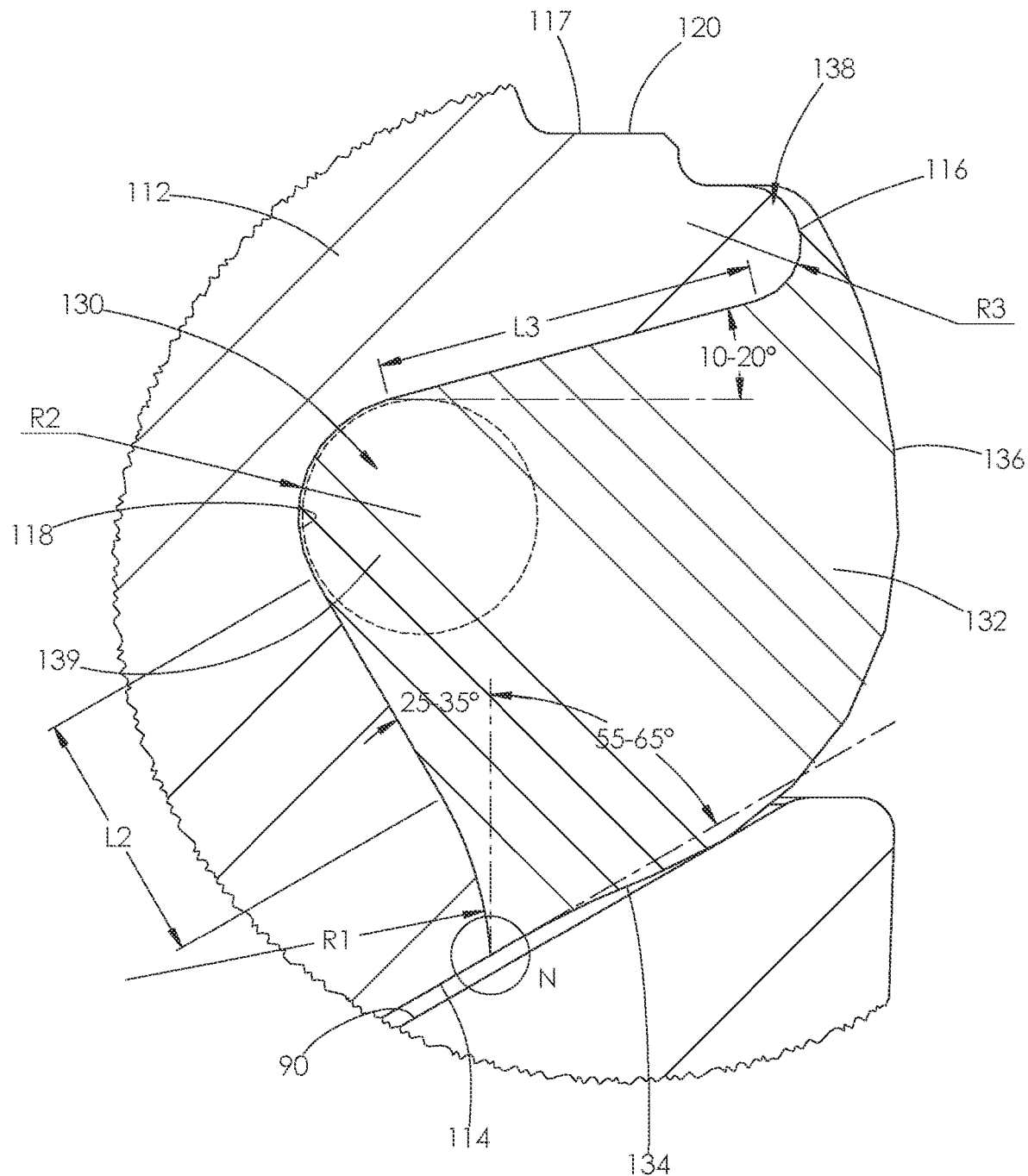
FIG. 20 is an enlarged view of area M shown in FIG. 22.

Continuing with FIG. 20, the recessed surface 118 forms a recess 130 within the valve body 112 for receiving a seal 132. The seal 132 comprises a strike face 134 joined to an outer face 136. The strike face 134 and the outer face 136 are identical to the strike face 98 and the outer face 100 of the seal 42. However, the recessed surface 118 the seal 132 engages is different from the recessed surface 76 formed in the valve body 70.

Figure 21:
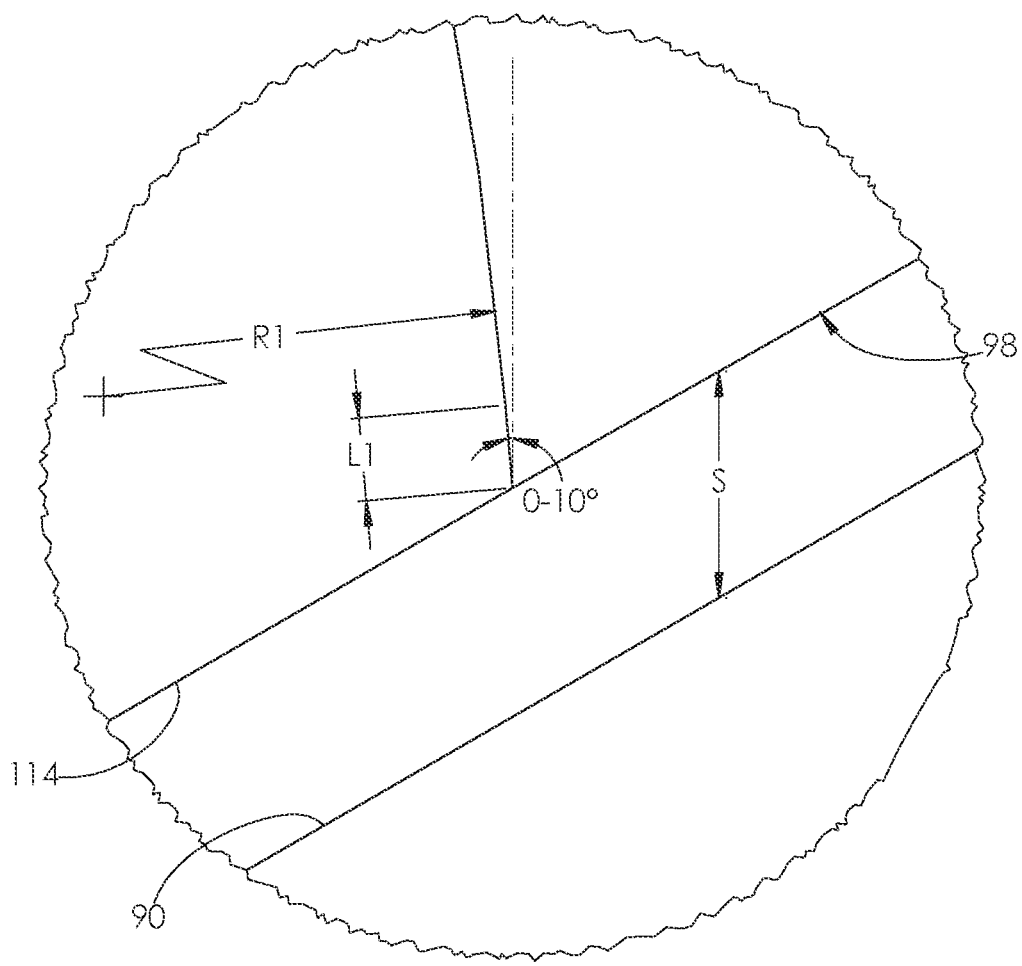
FIG. 21 is an enlarged view of area N shown in FIG. 20.

Continuing with FIGS. 20 and 21, a profile of the recessed surface 118 comprises a plurality of straight-line segments and a plurality of radius segments. The straight-line segments comprise: L1, L2, and L3. The radius segments comprise: R1 and R2. L1 starts at the end of the tapered sealing surface 114 as shown in FIG. 21. L1 extends a short distance and transitions into R1. R1 transitions into L2, L2 transitions into R2, R2 transitions in L3, and L3 transitions into the side surface 116. Put another way, L1 is positioned intermediate the tapered sealing surface 114 and R1, L2 is positioned intermediate R1 and R2, L3 is positioned intermediate R2 and the side surface 116.

Continuing with FIG. 20, the side surface 116 of the valve body 112 comprises a radius segment, R3. R3 transitions into the upper surface 120 of the valve body 112. Thus, R3 is positioned intermediate L3 and the upper surface 120. The shape of L3 and R3 forms a flange 138 at a top end of the valve 41. The flange 138 provides the same advantages as the flange 94 formed on the valve 34.

Continuing with FIGS. 20 and 21, straight-line segment, L1 extends at a 0-10-degree angle counterclockwise from vertical, preferably 5-degrees, as shown in FIG. 21. Straight-line segment, L2 may be at a 25-35-degree angle counterclockwise from vertical, preferably 30-degrees. Straight-line segment, L3 may be at a 10-20-degree angle counterclockwise from horizontal, preferably 15-degrees. While the specific values of L1, L2, and L3 may vary depending on the size of the valve 41, the relationship between the plurality of line segments are preferably: L3>L2>L1. Likewise, while the specific values of R1, R2, and R3 may vary depending on the size of the valve 41, the relationship between the plurality of radius segments are preferably: R1>R2>R3. For example, a 4-inch valve 41 may have a L1 value that is 50% of the L2 value, but a 6-inch valve may have a L1 value that is 30% of the L2 value. In both cases, L2 is greater than L1.

Continuing with FIG. 20, the plurality of straight-line segments and the plurality of radius segments together form a reservoir 139 on the internal portion of the seal 132 that absorbs energy caused by the compression and pressure loads encountered during operation. Like the valve body 70, the angle of straight-line segment, L2 further minimizes bulging on the outer face 136 of the seal 132, thereby reducing stress and strain on the seal 132.

Figure 22:
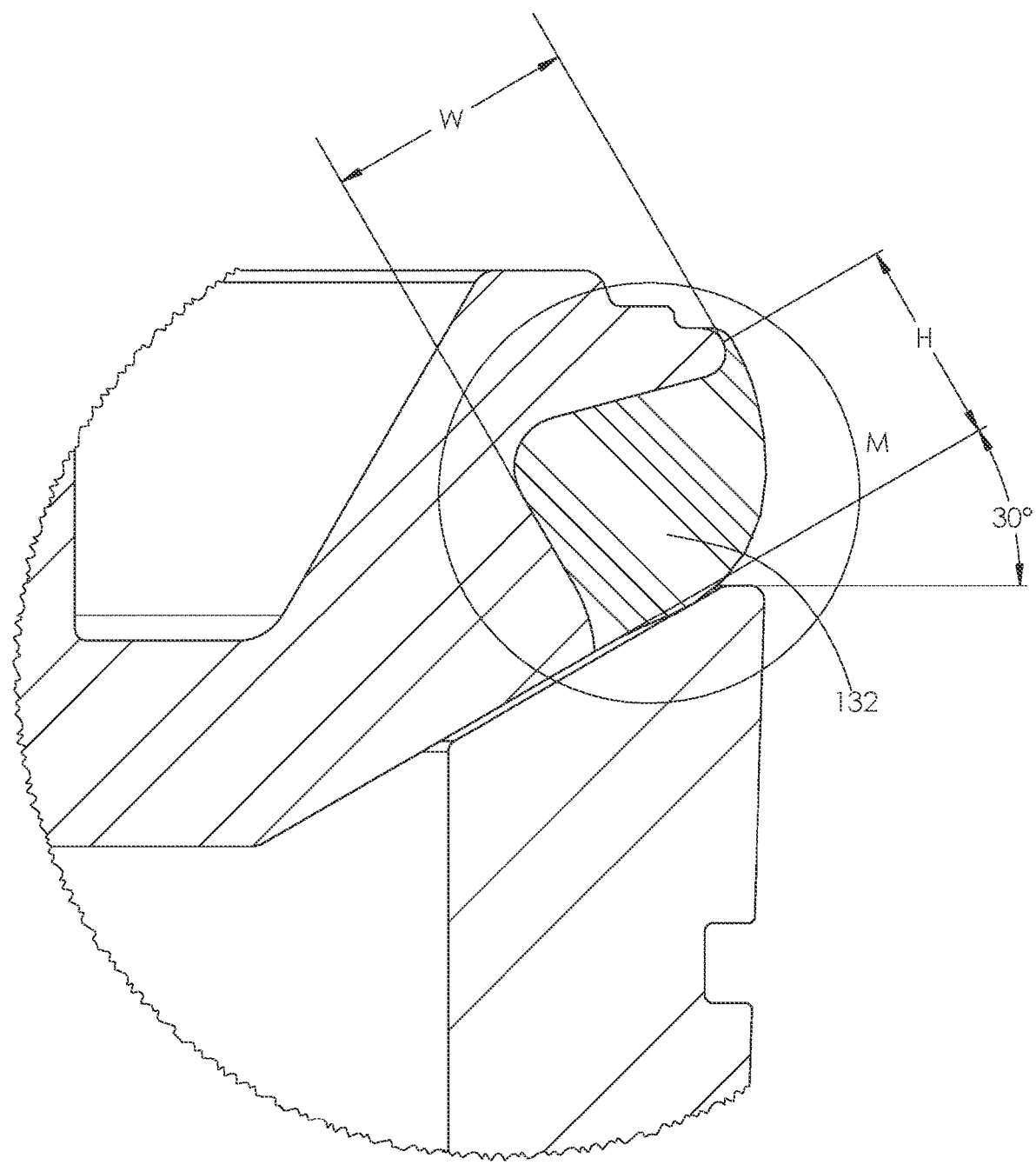
FIG. 22 is an enlarged view of area O shown in FIG. 18.

Continuing with FIG. 22, the height, H and width, W of the seal 132 are measured in the same general manner as the seal 42, shown in FIG. 15. The seal 132 preferably uses the same height and width ratios as the seal 42.

Figure 23:
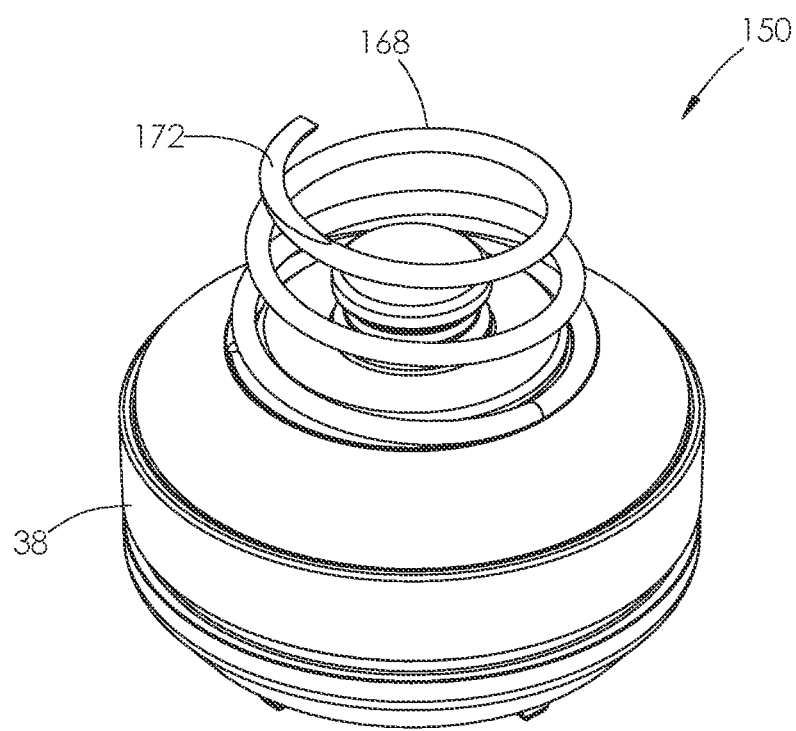
FIG. 23 is a top perspective view of another embodiment of a valve and the valve seat. The valve is shown in a closed position.
Figure 24:
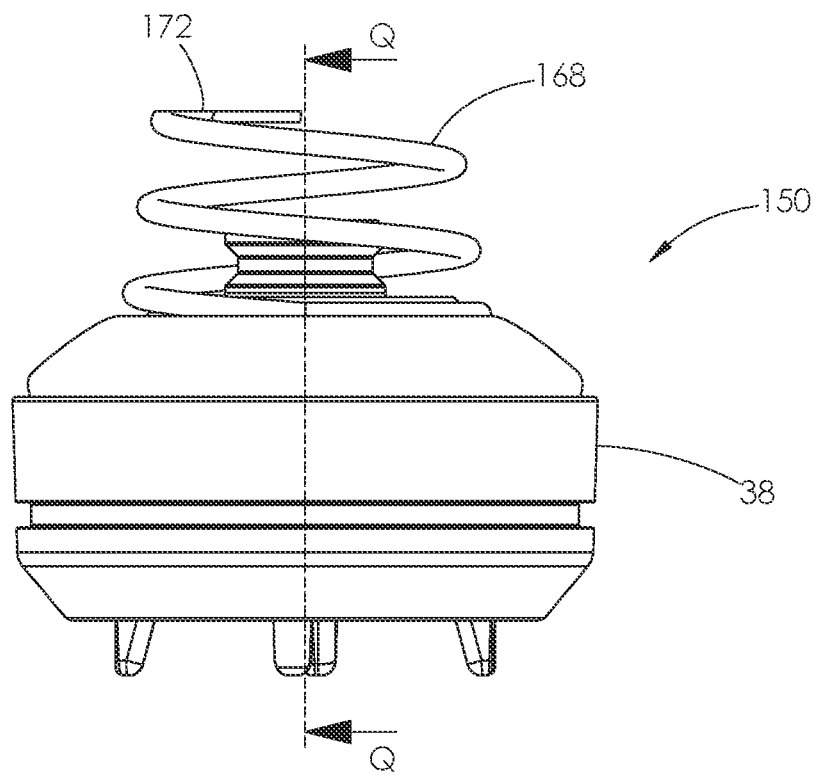
FIG. 24 is a side elevational view of the valve and valve seat shown in FIG. 23.
Figure 25:
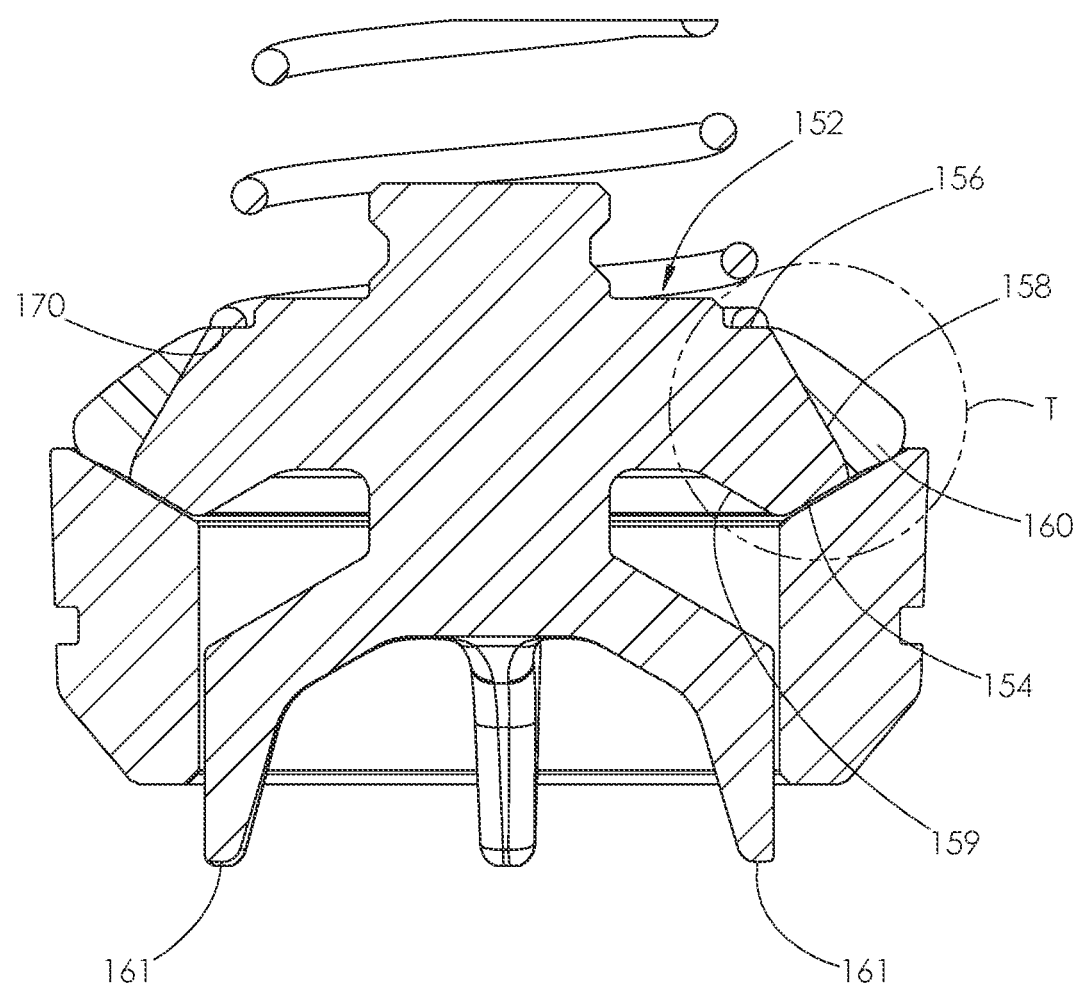
FIG. 25 is a cross-sectional view of the valve and valve seat shown in FIG. 24, taken along line Q-Q.
Figure 26:
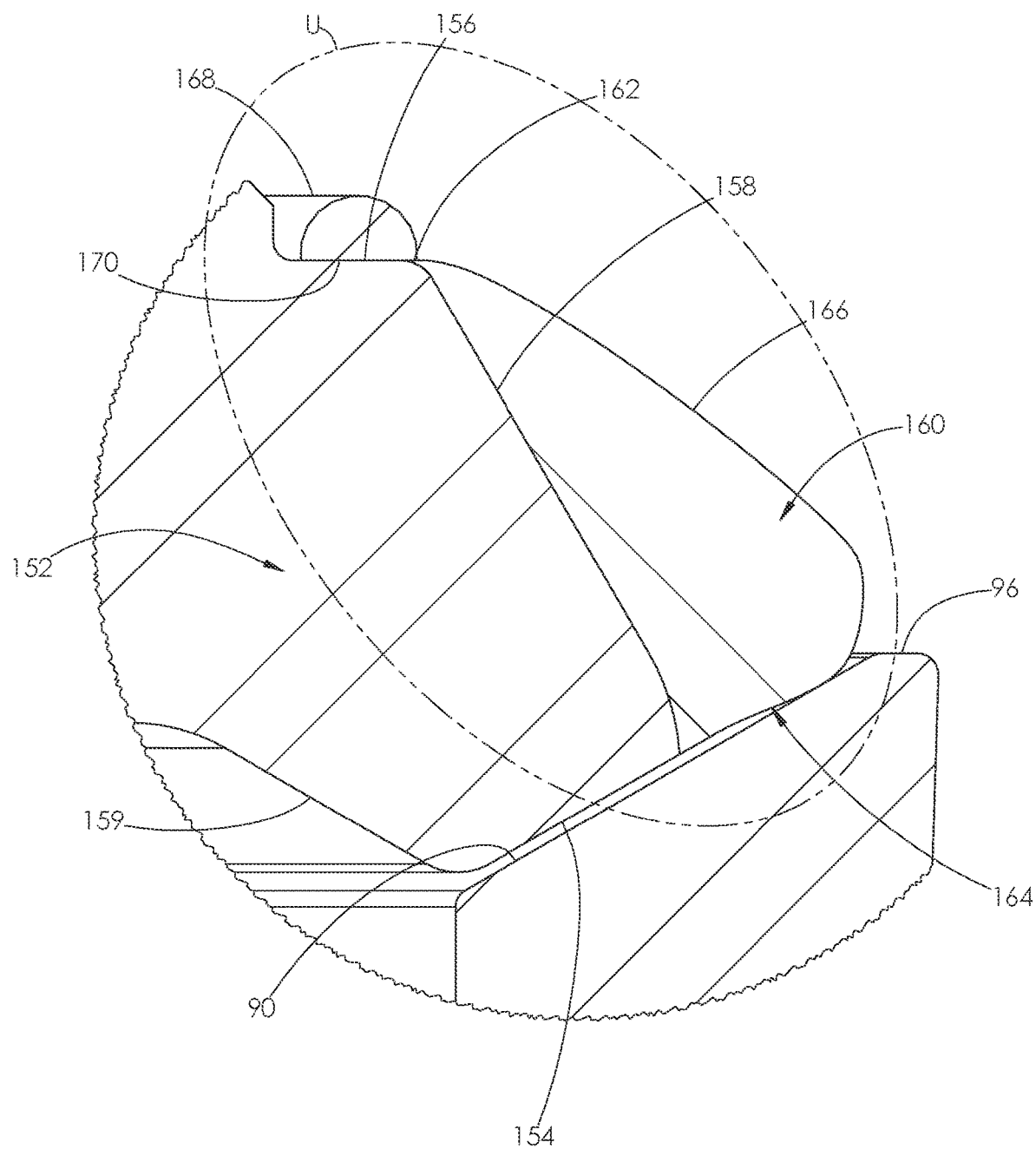
FIG. 26 is an enlarged view of area T shown in FIG. 25.

Turning to FIGS. 23-28, another embodiment of a valve 150 is shown. The valve 150 may be used as a discharge or an intake valve. The valve 150 comprises a valve body 152 having a tapered sealing surface 154 joined to an upper surface 156 by an intermediate surface 158, as shown in FIGS. 25 and 26. The tapered sealing surface 154 further joins a lower surface 159. In the embodiment shown in FIGS. 23-28, a plurality of legs 161 project from the lower surface 159, making the valve 150 a leg-guided valve.

Continuing with FIGS. 25 and 26, in contrast to the valves 34 and 42, the valve body 152 does not comprise a recessed surface or a recess for receiving a seal. Nor does the valve body 152 comprise a flange, like the flanges 94 or 138 shown in FIGS. 12 and 20. Instead, a seal 160 engages the intermediate surface 158 of the valve body 152. No part of the valve body 152 extends over any part of the seal 160.

Figure 27:
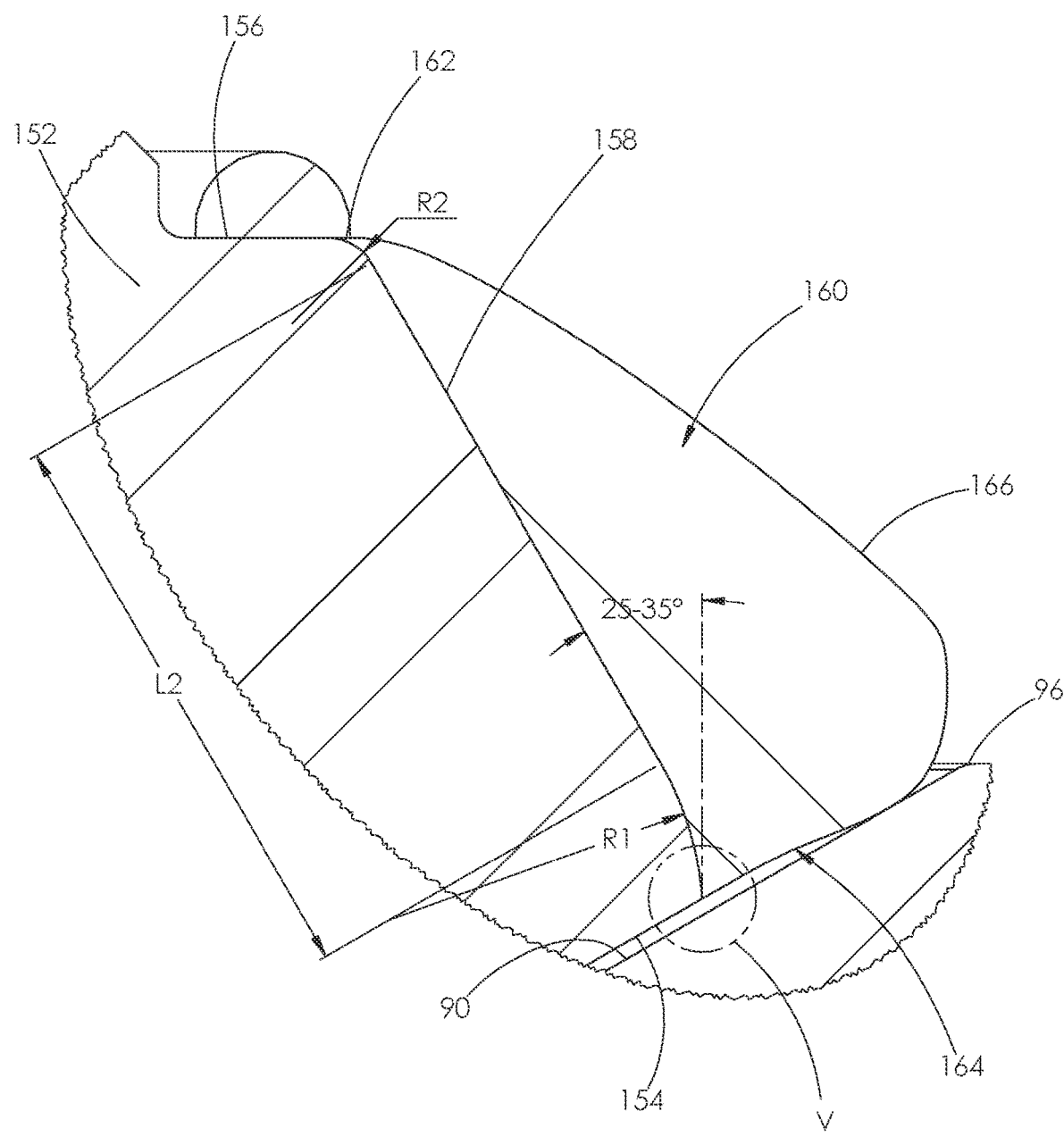
FIG. 27 is an enlarged view of area U shown in FIG. 26.
Figure 28:
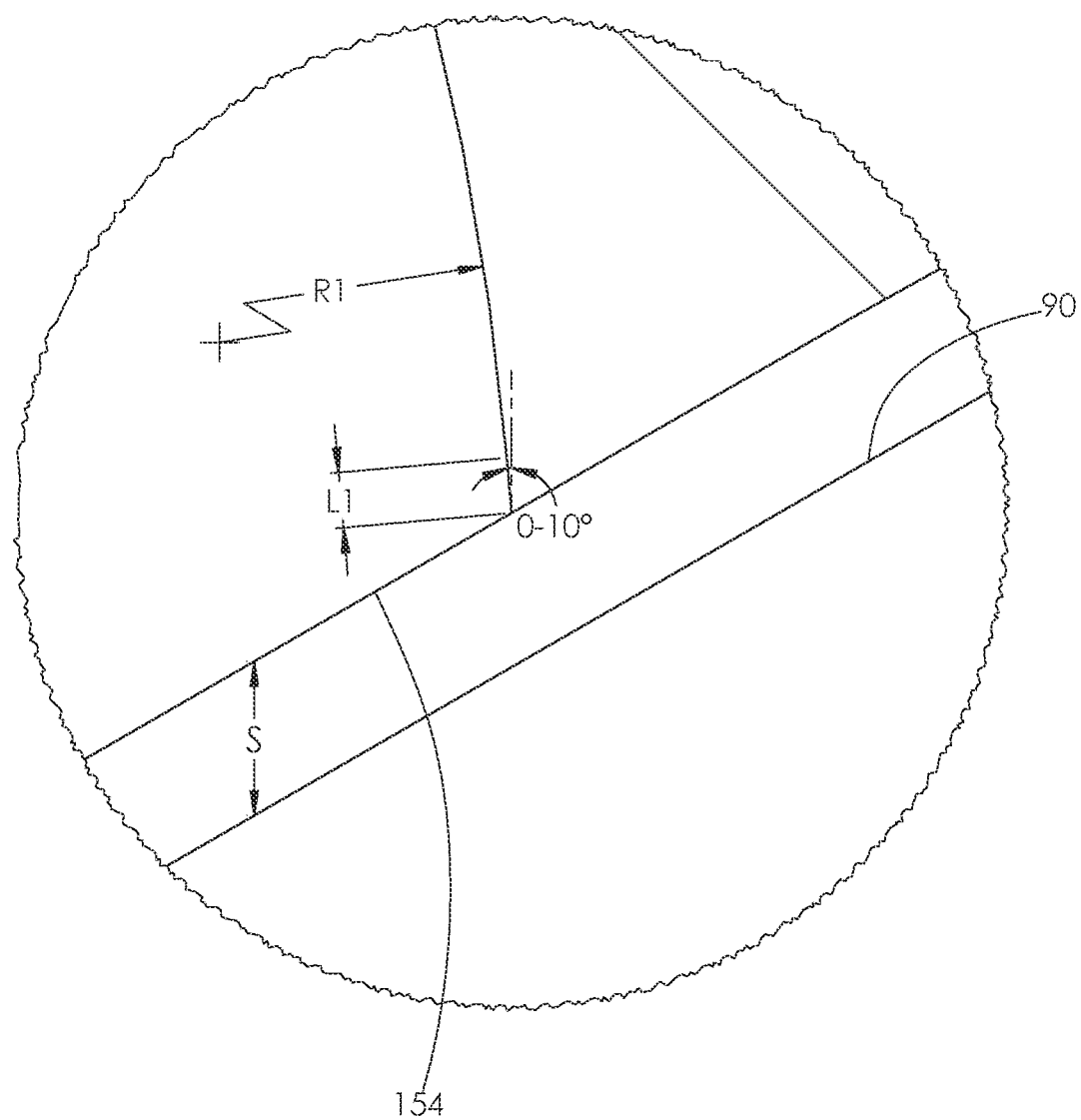
FIG. 28 is an enlarged view of area V shown in FIG. 27.

With reference to FIGS. 27 and 28, a profile of the intermediate surface 158 of the valve body 152 comprises a plurality of straight-line segments: L1 and L2, and a plurality of radius segments: R1 and R2. L1 joins the tapered sealing surface 154 and transitions into R1, as shown in FIG. 28. R1 transitions into L2, L2 transitions into R2, and R2 joins the upper surface 156 of the valve body 152, as shown in FIG. 27. Put another way, L1 is positioned intermediate the tapered sealing surface 154 and R1, L2 is positioned intermediate R1 and R2, and R2 is positioned intermediate L2 and the upper surface 156.

Continuing with FIGS. 27 and 28, L1 extends at a 0-10-degree angle counterclockwise from vertical, preferably 5-degrees, as shown in FIG. 28. L2 may be at a 25-35-degree angle counterclockwise from vertical, preferably 30-degrees, as shown in FIG. 27. While the specific values of L1 and L2 may vary depending on the size of the valve 150, the relationship between the plurality of line segments are preferably: L2>L1. Likewise, while the specific values of R1 and R2 may vary depending on the size of the valve 150, the relationship between the plurality of radius segments are preferably: R1>R2.

Continuing with FIG. 27, the seal 160 is typically made of urethane and is molded to the valve body 152 such that the seal 160 engages L1, R1, L2, and R2 of the intermediate surface 158 and an edge 162 of the seal 160 joins the upper surface 156. The seal 160 comprises a strike face 164 joined to an outer face 166. The strike face 164 is identical to the strike face 98 shown in FIG. 14. Like the seals 42 and 132, the outer face 166 is one continuous curve, with no straight sections. Preferably, the curve is a splined curve. The curve of the outer face 166, however, has a different shape than the outer faces 100 and 136.

Continuing with FIGS. 26 and 27, the outer face 166 has an even more gradual curve than the outer faces 100 and 136 such that it has a less rounded shape. Instead, an upper portion of the outer face 166 has a more sloped shape, such that the edge 162 of the seal is positioned farther away from an outer edge 96 of the valve seat 38 than the seals 42 and 132. Such construction of the seal 160 helps prevent the seal 160 from wrapping around the edge 96 of the valve seat 38 during operation because no portion of the seal extends past the outermost diameter of the tapered strike face 90. Like the seals 42 and 132, the outer face 166 does not include any bulbous protrusions or channels.

Continuing with FIGS. 26 and 27, the shape of the intermediate surface 158 and the shape of the attached seal 160 exposes the entire outer face 166 of the seal 160 to the fluid pressure within the fluid end. The pressure applies a force perpendicular to the surface of the outer face 166 of the seal 160 at every point along the outer face 166. The resultant force presses the seal 160 into the valve body 152, thereby reducing the shearing effect of the fluid flow as it exits the valve 150.

Turning back to FIGS. 23-25, the valve 150 is shown with another embodiment of a valve spring 168. The spring 168 is identical to the spring 40, but a bottom end 170 of the spring 168 is squared and ground to provide a more even force application to the upper surface 156 of the valve body 152, as shown in FIG. 26. Likewise, a top end 172 of the spring 168 is ground so as to better engage a valve retainer, as shown in FIGS. 23 and 24. Such modifications or like modifications may be made to any of the springs used with the various embodiments of valves disclosed herein so as to provide a more even force application to the corresponding surfaces.

Figure 29:
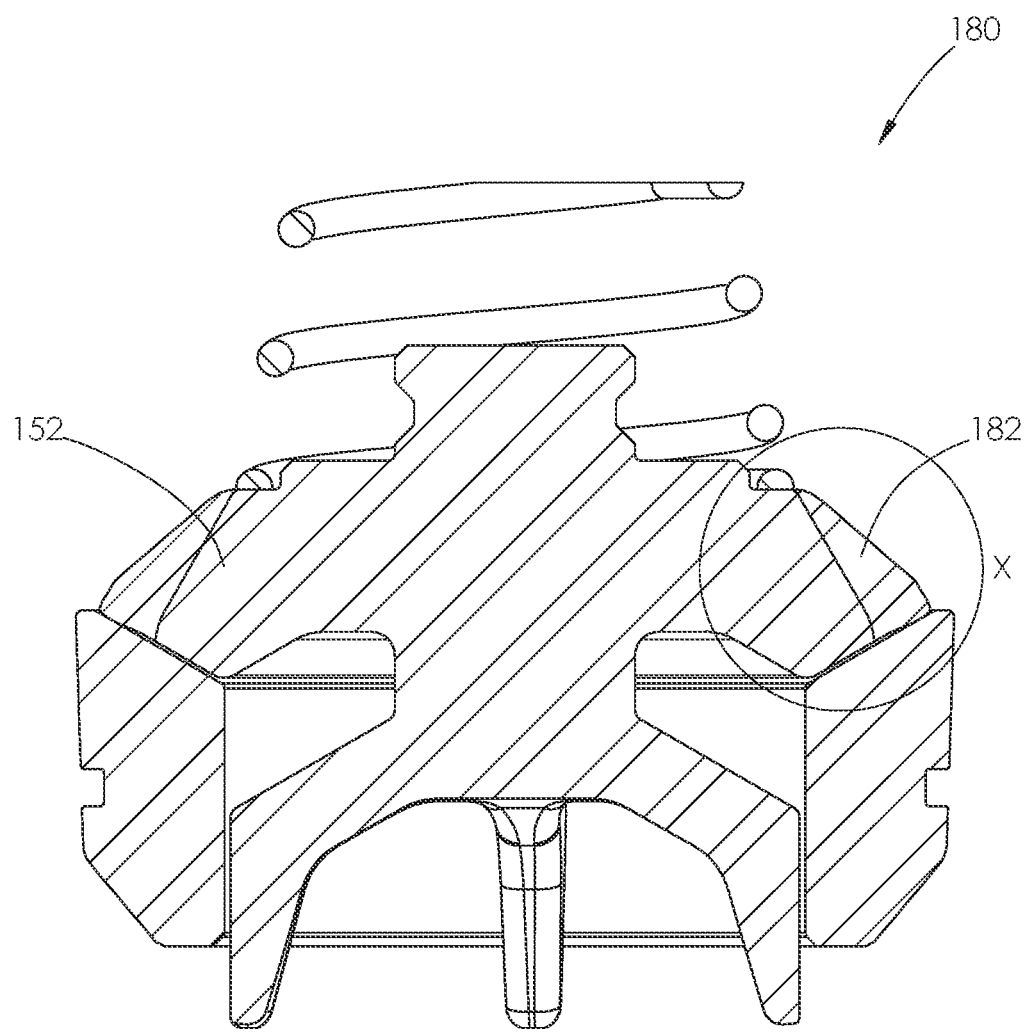
FIG. 29 is a cross-sectional view of another embodiment of a valve and the valve seat. The valve is shown in an almost closed position.
Figure 30:
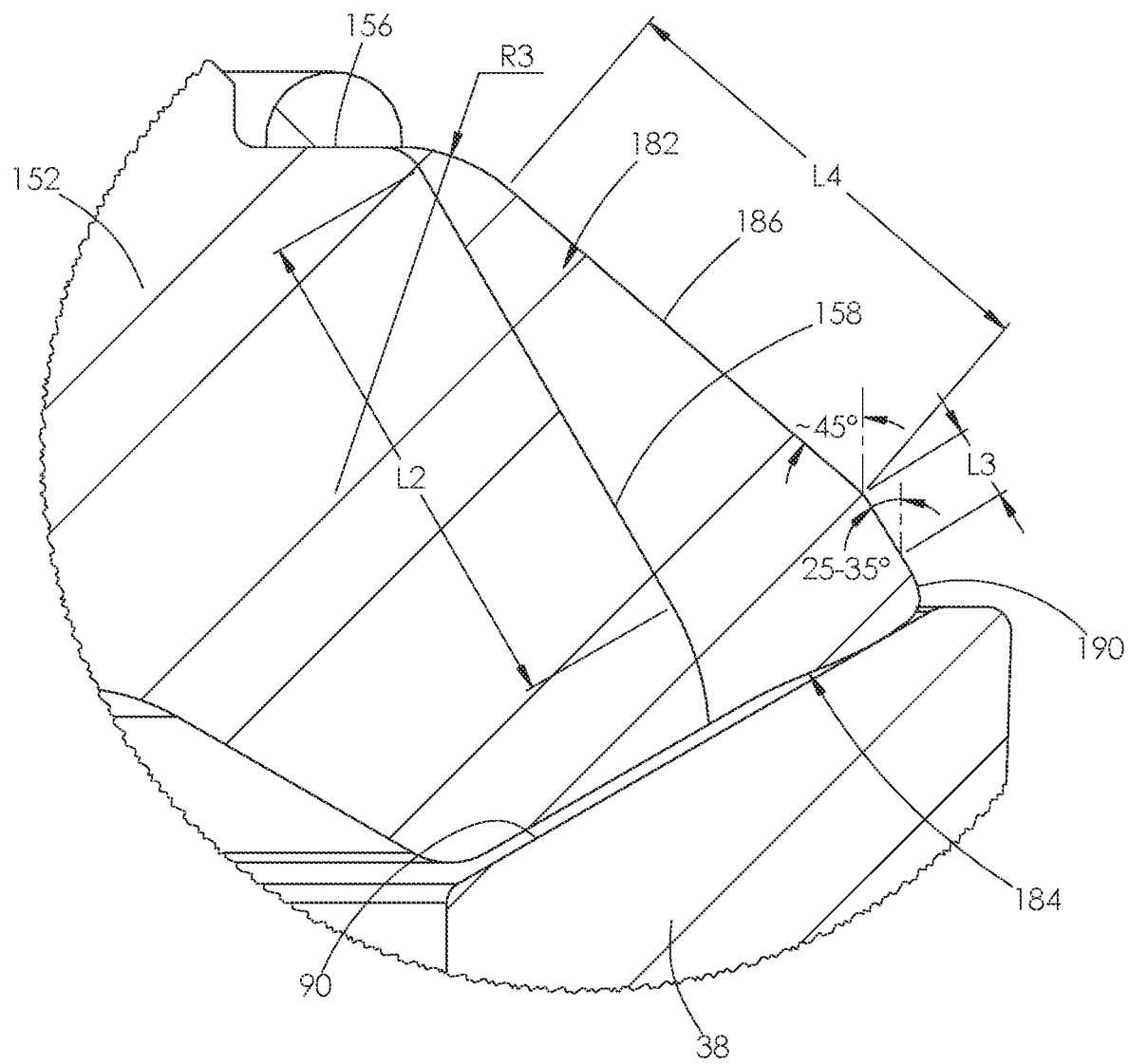
FIG. 30 in an enlarged view of area X shown in FIG. 29.

Turning to FIGS. 29 and 30, another embodiment of a valve 180 is shown. The valve 180 may be used as a discharge or an intake valve. The valve 180 comprises the valve body 152 used with the valve 150, but the valve 180 uses a different embodiment of a seal 182. The seal 182 comprises a strike face 184 joined to an outer face 186, as shown in FIG. 30. The strike face 184 is identical to the strike face 164 of the seal 160, but the seal 182 has another embodiment of an outer face 186.

Continuing with FIG. 30, in contrast to the outer face 166 of the seal 160, the outer face 186 of the seal 182 is not a splined curve. Instead, the outer face 186 comprises two straight-line segments: L3 and L4, and a radius segment: R3. L3 joins a transition section 190 to the outer face 186. The transition section 190 joins the strike face 184 to the outer face 186. L3 transitions into L4, and L4 transitions into R3. R3 is joined to the upper surface 156 of the valve body 152. Put another way, L3 is positioned intermediate the strike face 184 and L4. More specifically, L3 is positioned intermediate the transition section 190 and L4. L4 is positioned intermediate L3 and R3, and R3 is positioned intermediate L4 and the upper surface 156.

Continuing with FIG. 30, L3 extends perpendicular to the tapered strike face 90 of the valve seat 38 and is parallel to L2 of the intermediate surface 158 of the valve body 152. L3 preferably extends at an angle that is 30-degrees counterclockwise from vertical. The angle may have a range of plus or minus 5-degrees, with the intent that L3 maintains the desired perpendicular and parallel relationships with the valve seat 38 and valve body 152.

Continuing with FIG. 30, L4 extends at angle between L3 and R3. While the angle shown in FIG. 30 is approximately 45-degrees counterclockwise from vertical, it may be any value greater than the angle of L3. Such construction of the seal 182 provides a tapering of the outer face 186 towards the upper surface 156 of the valve body 152. The flat surface provided by L4 directs the resultant force applied by fluid pressure directly into the valve body 152, thereby reducing the tensile force attempting to tear the seal 182 away from the valve body 152 during operation.

Continuing with FIG. 30, the flat surface of the seal 182 created by L4 directs the resultant force in two directions. The first direction is into the valve body 152, and the second direction is perpendicular to the strike face 184. The direction of such forces counteracts the upward force applied by fluid as it exits the valve 180 and the upward force applied by the closing of the valve 180, thereby reducing the shear between the seal 182 and the intermediate surface 158 of the valve body 152.

Turning to FIGS. 31-35, another embodiment of a valve 200 is shown. The valve 200 may be used as a discharge or an intake valve. The valve 200 comprises the valve 180 and a conical sleeve 202. The conical sleeve 202 is shaped to fit over the outer face 186 of the seal 182 and acts as a retaining mechanism for the seal 182 during operation. The conical sleeve 202 also protects the outer face 186 of the seal 182 from erosion during operation. The use of the conical sleeve 202 also requires the valve 200 to use another embodiment of a spring 204, which will be described in more detail herein.

Figure 34:
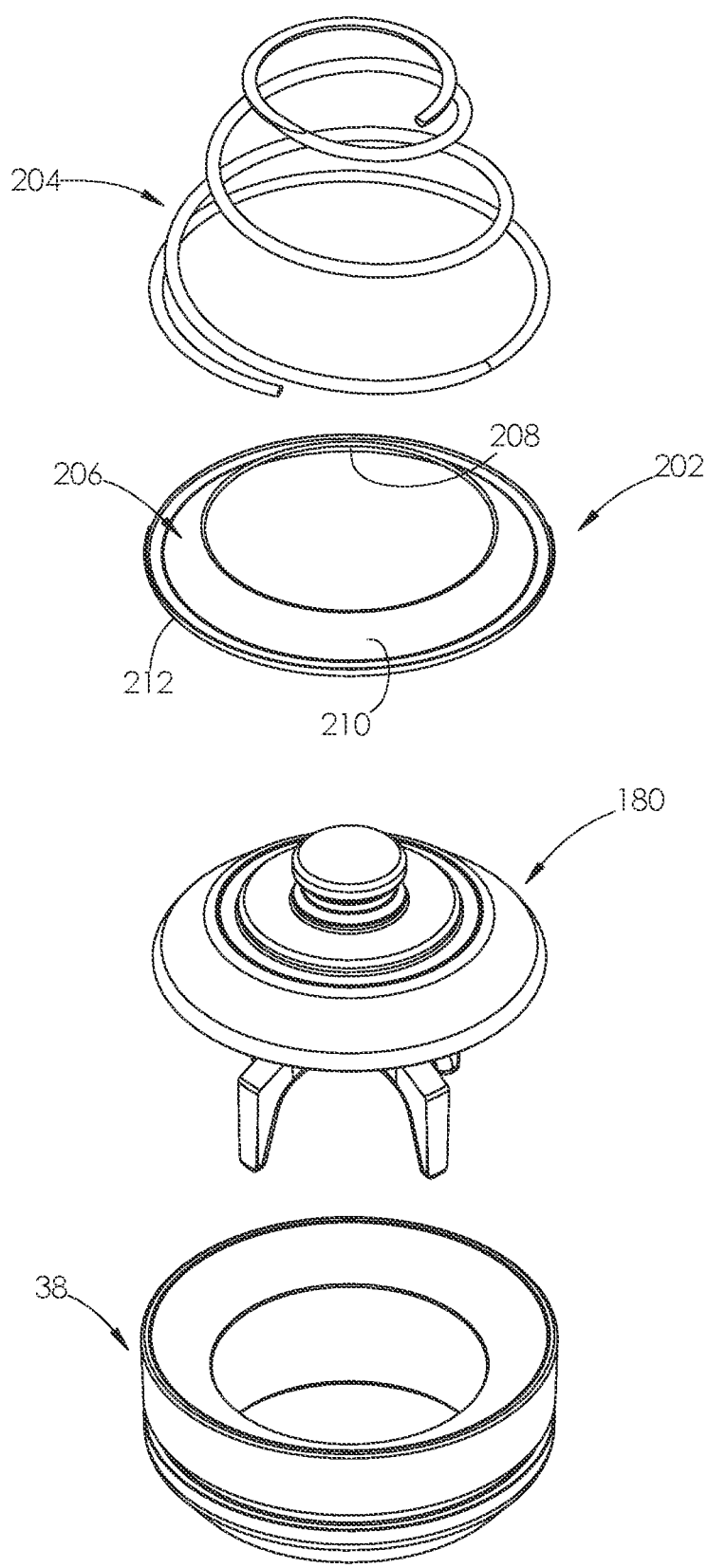
FIG. 34 is an exploded view of the valve and valve seat shown in FIG. 31.
Figure 35:
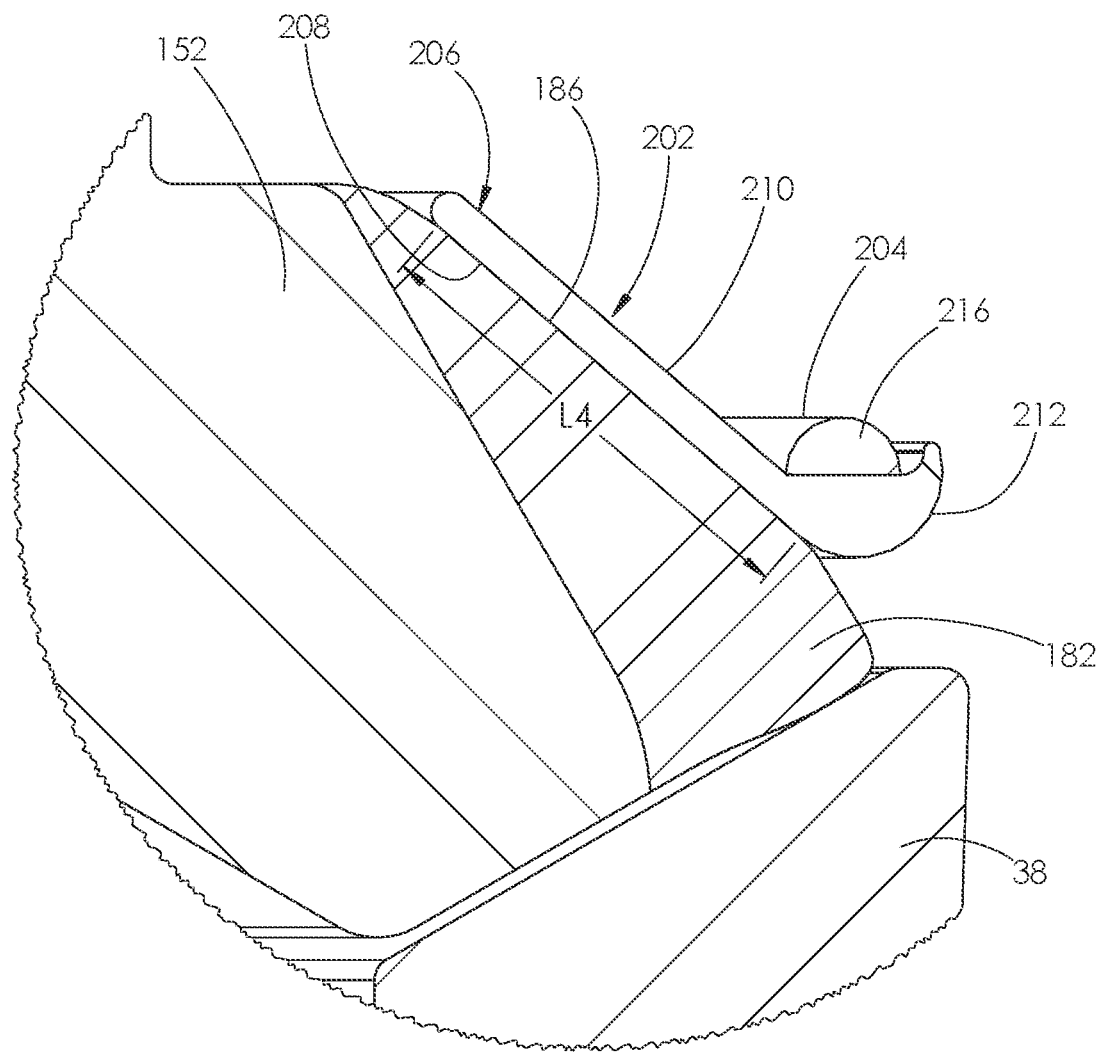
FIG. 35 is an enlarged view of area Z shown in FIG. 33.

Continuing with FIGS. 34 and 35, the conical sleeve 202 comprises a body 206 having an inner face 208 and an outer face 210. The body 206 further comprises a lip 212 formed around the outer face 210 and at a bottom end of the body 206. The lip 212 is sized to receive a bottom end 216 of the spring 204. The inner face 208 of the sleeve 202 is congruent to straight-line segment, L4 of the outer face 186 of the seal 182, as shown in FIG. 35. The conical sleeve 202 is installed on the valve 180 such that the outer face 186 of the seal 182 engages the inner face 208 of the sleeve 202. The sleeve 202 is held against the seal 182 by tension applied by the spring 204. Thus, the sleeve 202 is easily separated from the seal 182, if needed. The sleeve 202 only contacts the seal 182 and the spring 204. The sleeve 202 does not contact any portion of the valve body 152, the valve seat 38, or the fluid end.

Turning back to FIGS. 31 and 32, in order to rest within the lip 212 of the sleeve 202, the spring 204 has a conical shape, similar to the spring 119 shown in FIG. 3. The bottom end 216 of the spring 204 has a greater diameter than the springs 40 and 168, while a top end 218 of the spring 204 has the same diameter as the springs 40 and 168. The increased diameter at the bottom end 216 of the spring 204 provides stability and leverage to keep the seal 182 contained within the sleeve 202. The actual diameters of the springs 40, 119, 168, and 204 may vary depending upon the size of the valve used.

Figure 31:
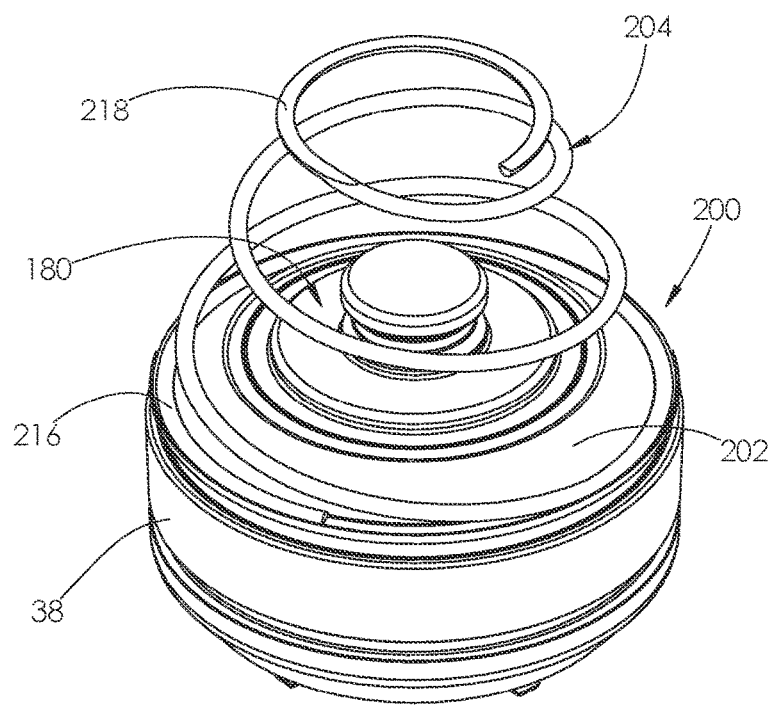
FIG. 31 is a top perspective view of another embodiment of a valve and the valve seat. The valve is shown in a closed position.
Figure 32:
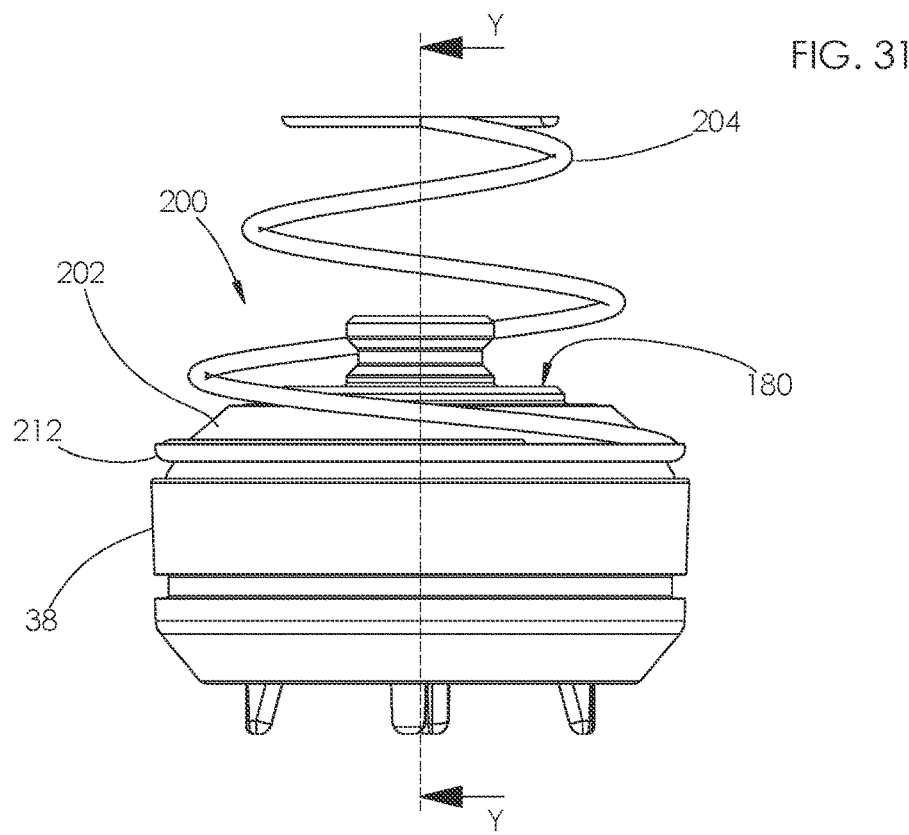
FIG. 32 is a side elevational view of the valve and valve seat shown in FIG. 31.
Figure 33:
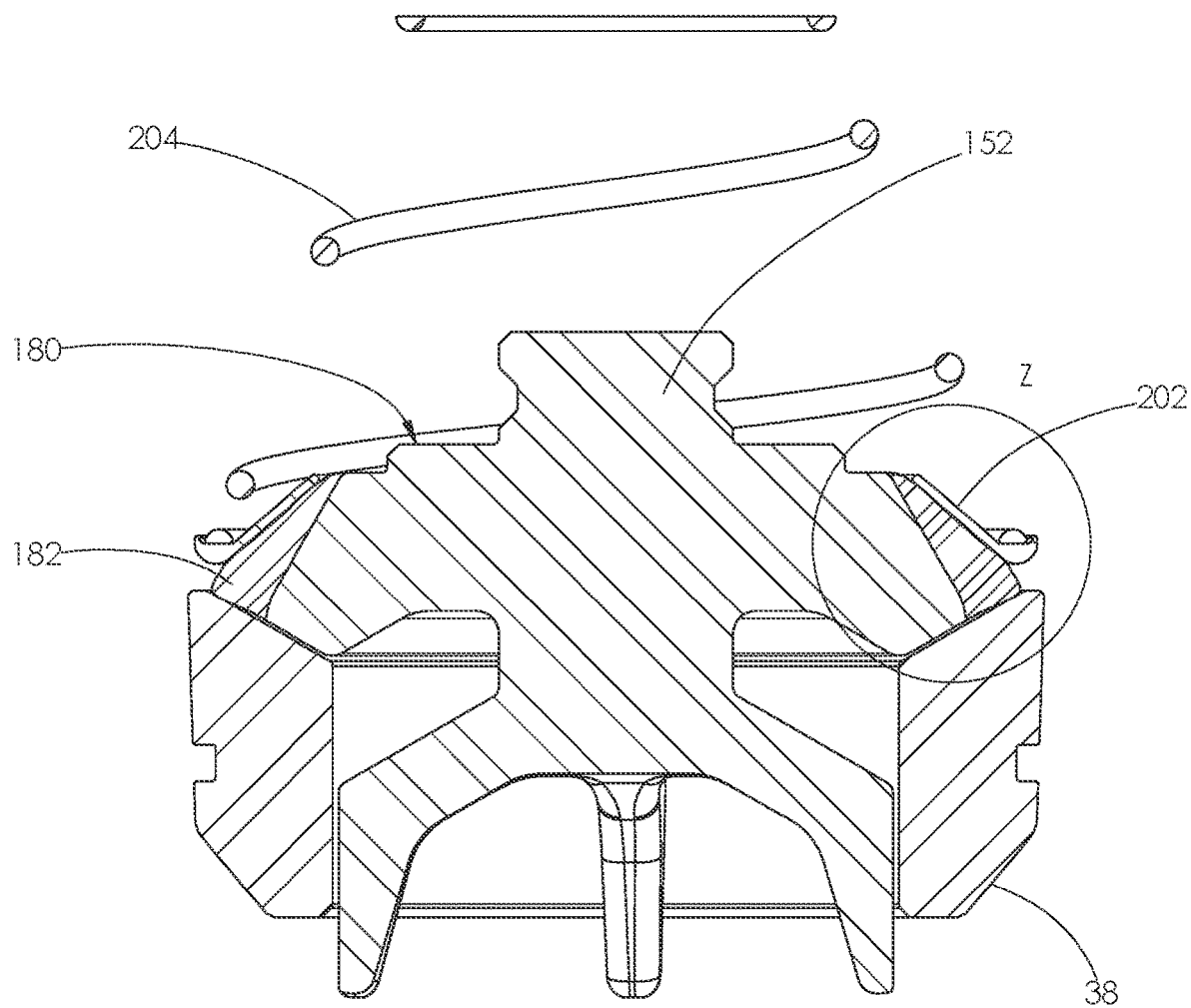
FIG. 33 is a cross-sectional view of the valve and valve seat shown in FIG. 32, taken along line Y-Y. The valve is shown in an almost closed position.

Continuing with FIGS. 31 and 32, the spring 204 may be squared and/or ground at its ends like the spring 168, if desired. The spring 204 and the sleeve 202 may be separate pieces that are held together by compression during operation. Alternatively, the spring 204 may be welded to the sleeve 202 or attached by other methods known in the art.

Figure 36:
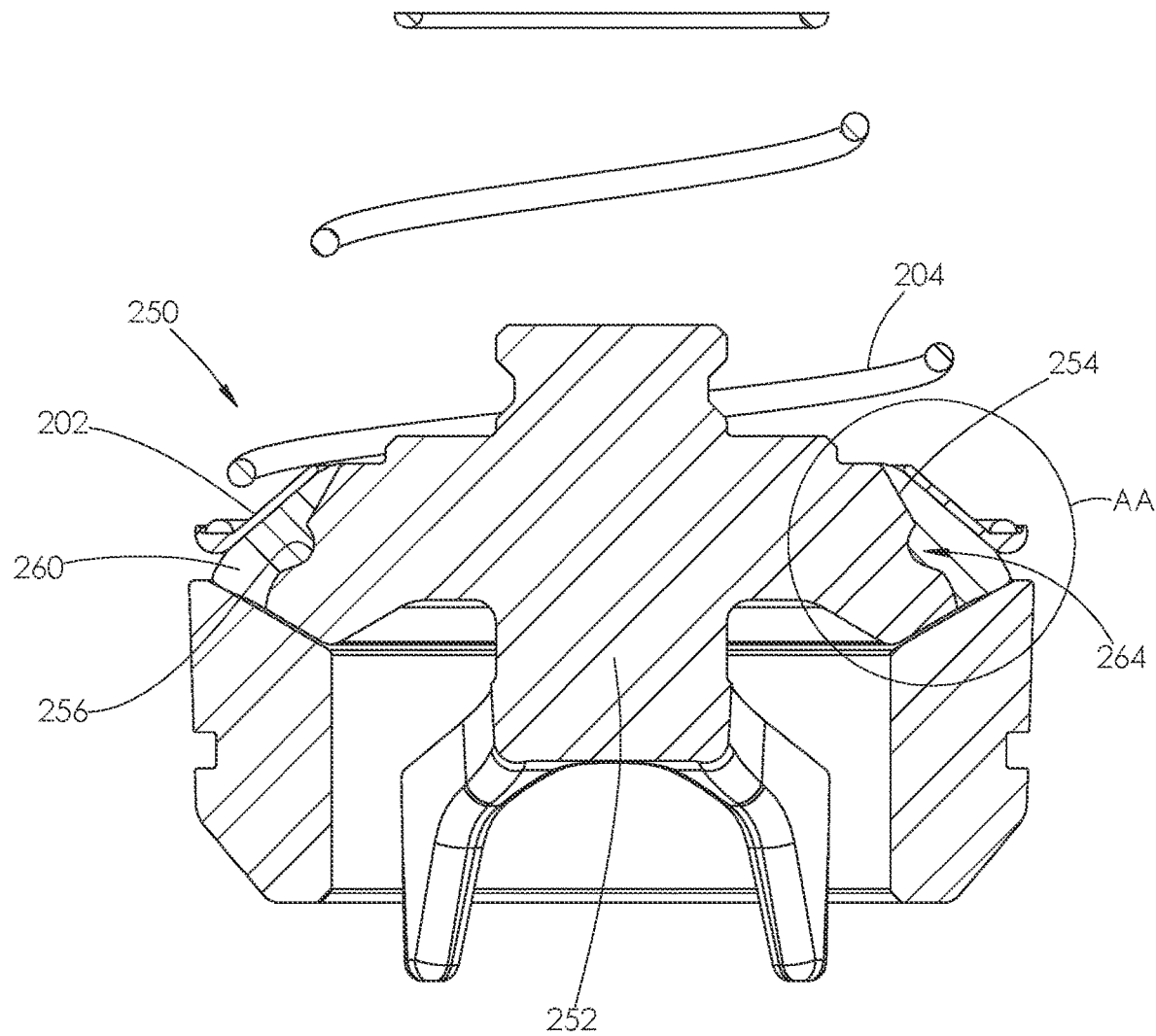
FIG. 36 is a cross-sectional view of another embodiment of a valve and the valve seat. The valve is shown in an almost closed position.
Figure 37:
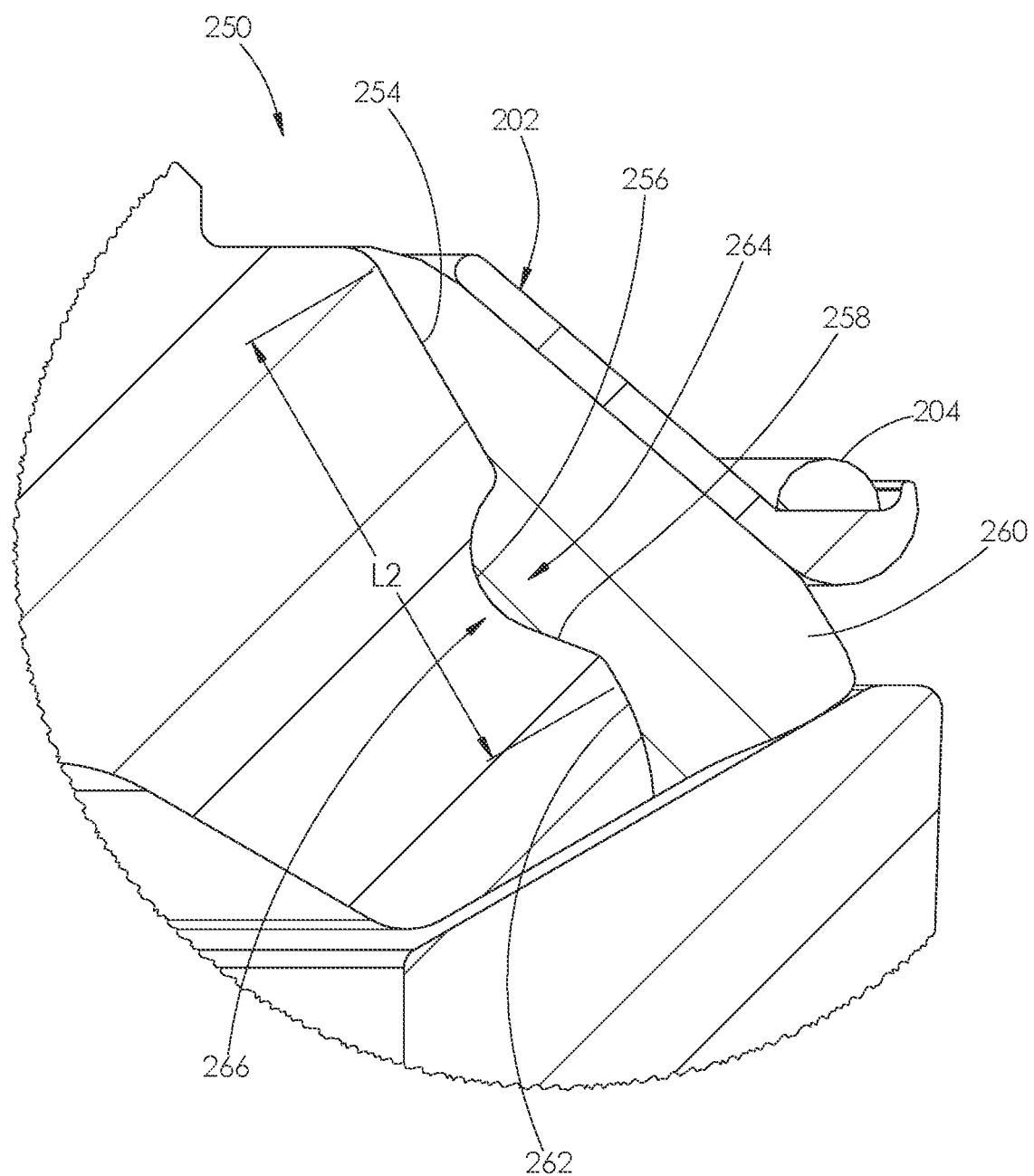
FIG. 37 is an enlarged view of area AA shown in FIG. 36.

Turning to FIGS. 36 and 37, another embodiment of a valve 250 is shown. The valve 250 may be used as a discharge or an intake valve. The valve 250 comprises a valve body 252. The valve body 252 is identical to the valve body 152, but the valve body 252 comprises another embodiment of an intermediate surface 254. The intermediate surface 254 is identical to the intermediate surface 158 but comprises a groove 256 formed within straight-line segment, L2. As shown in FIG. 37, a bottom surface 258 of the groove 256 has a negative slope, as viewed from the center of the valve body 252 toward the outer diameter of the valve body 252.

Continuing with FIGS. 36 and 37, the valve 250 further comprises another embodiment of a seal 260. The seal 260 is identical to the seal 182, but an inner surface 262 of the seal 260 comprises a protrusion 264 sized to correspond with the shape of the groove 256. The protrusion 264 and the groove 256 together act as a locking mechanism 266 between the valve body 252 and the seal 260, as shown in FIG. 37. In operation, the locking mechanism 266 provides more surface area for the seal 260 and the intermediate surface 254 to interface, thereby reducing the force per unit area applied to such interface. The locking mechanism 266 also provides varying angles at the interface between the seal 260 and the intermediate surface 254. The varying angles interrupt the application of the shear force along such interface, thereby increasing the life of the bond between the seal 260 and the valve body 252.

Continuing with FIGS. 36 and 37, the valve 250 also used the conical sleeve 202 and spring 204 used with the valve 200. In alternative embodiments, the valve 250 may not use the conical sleeve 202 and instead be used with the spring 40 or 168, shown in FIGS. 2 and 23.

Figure 38:
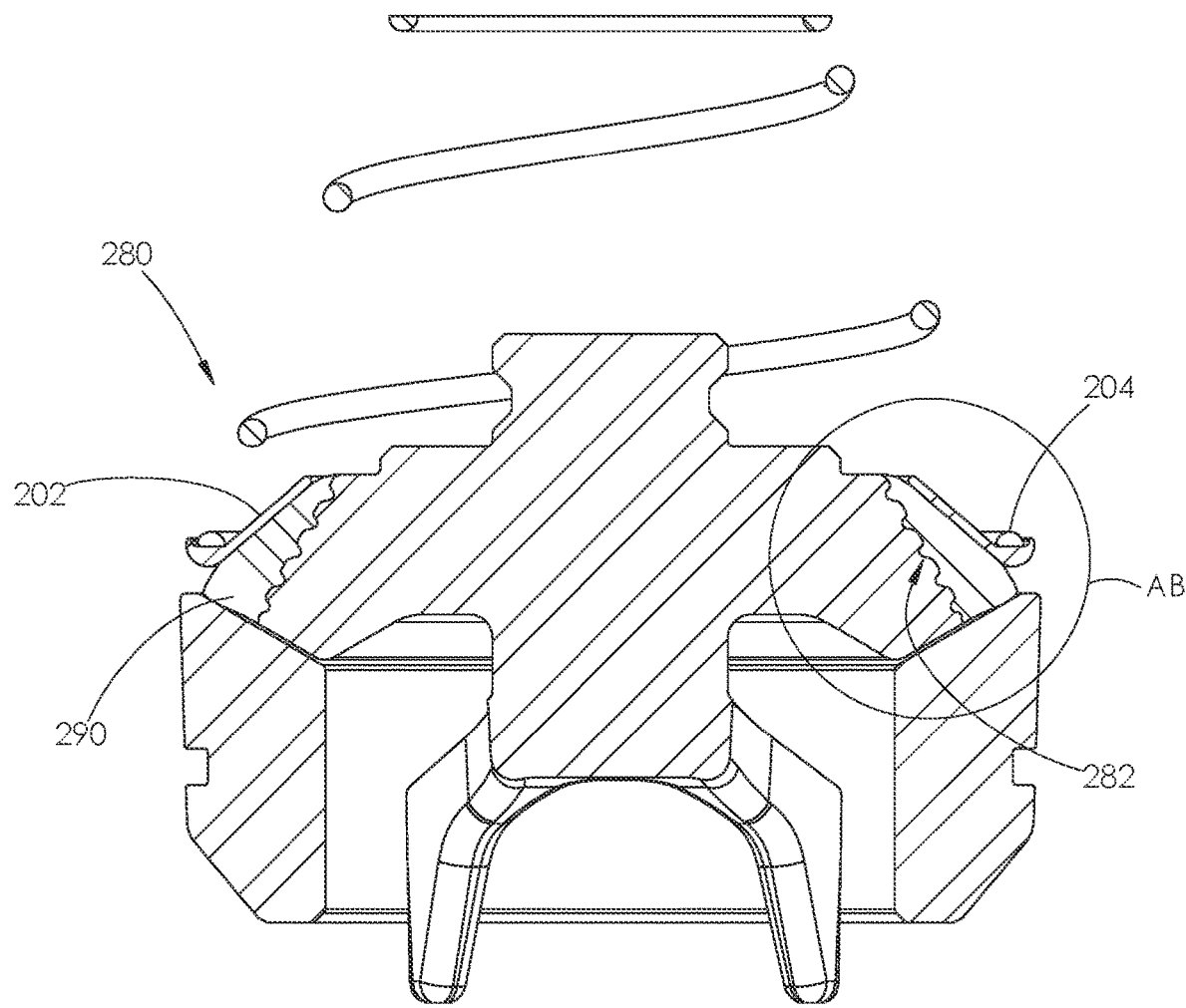
FIG. 38 is a cross-sectional view of another embodiment of a valve and the valve seat. The valve is shown in an almost closed position.
Figure 39:
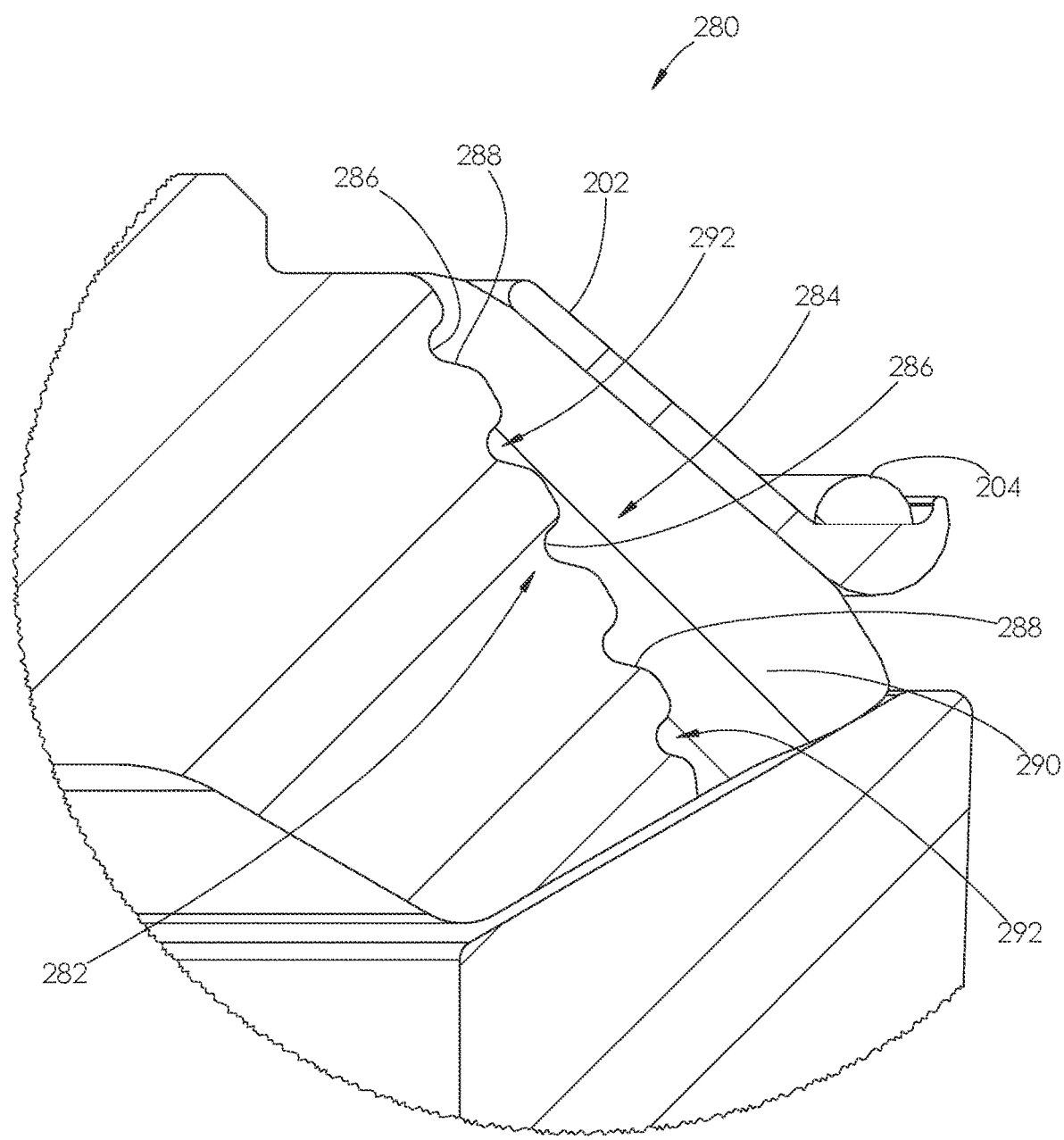
FIG. 39 is an enlarged view of area AB shown in FIG. 38.

Turning to FIGS. 38 and 39, another embodiment of a valve 280 is shown. The valve 280 is identical to the valve 250, but the valve 280 comprises another embodiment of a locking mechanism 282. Instead of just a single groove formed in an intermediate surface of the valve, the intermediate surface 284 of the valve 280 comprises a plurality of grooves 286 formed along its length. Like the groove 256, a bottom surface 288 of each groove 286 has a negative slope.

Continuing with FIG. 39, the valve 280 further uses another embodiment of a seal 290. The seal 290 is identical to the seal 260 but comprises a plurality of protrusions 292. Each protrusion 292 is sized to mate with a corresponding one of the grooves 286. The mating protrusions 292 and grooves 286 together form the locking mechanism 282. The locking mechanism 282 provides even more surface area for the seal 290 to interface with the intermediate surface 284. The locking mechanism 282 also provides more interruption points in case the seal 290 begins to separate from the intermediate surface 284.

Continuing with FIGS. 38 and 39, the valve 280 also uses the conical sleeve 202 and the spring 204 used with the valve 200. In alternative embodiments, the valve 280 may not use the conical sleeve 202 and instead be used with the spring 40 or 168, shown in FIGS. 2 and 23.

Figure 40:
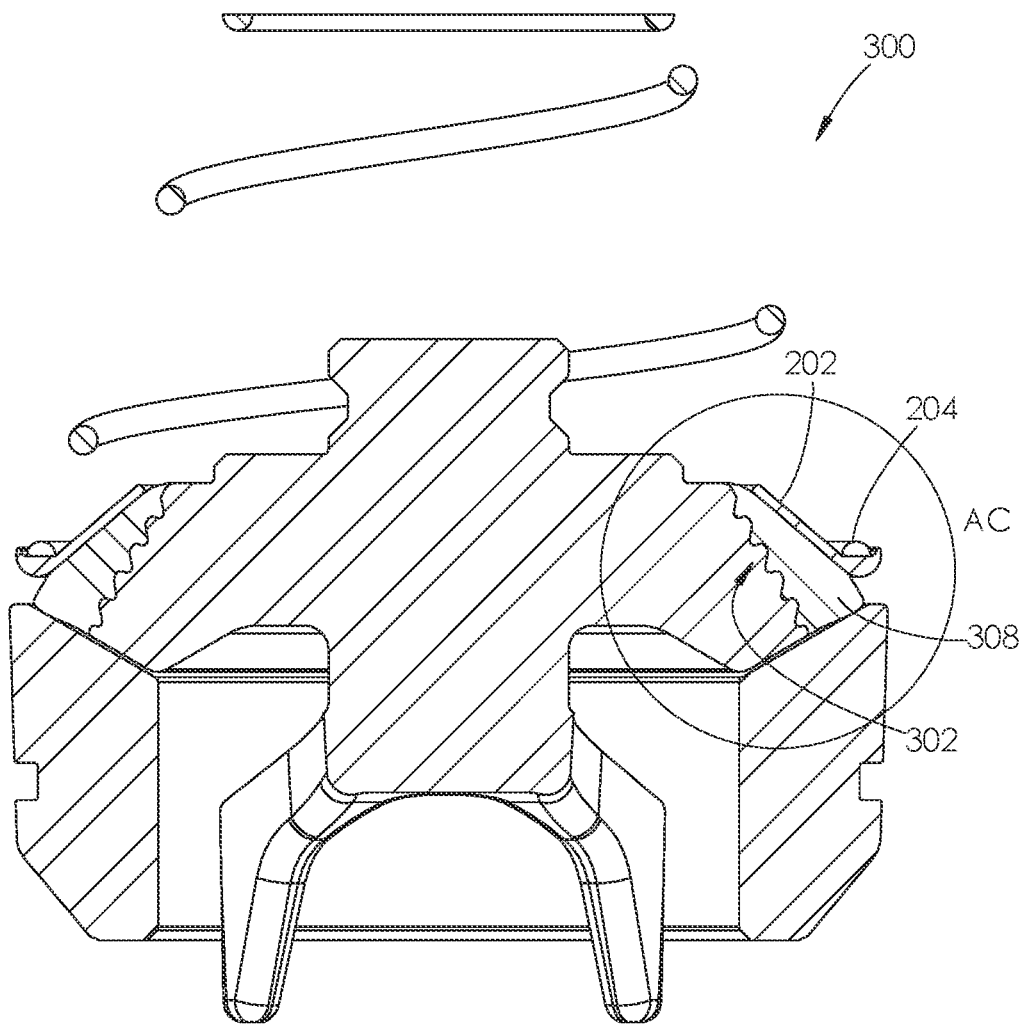
FIG. 40 is a cross-sectional view of another embodiment of a valve and the valve seat. The valve is shown in an almost closed position.
Figure 41:
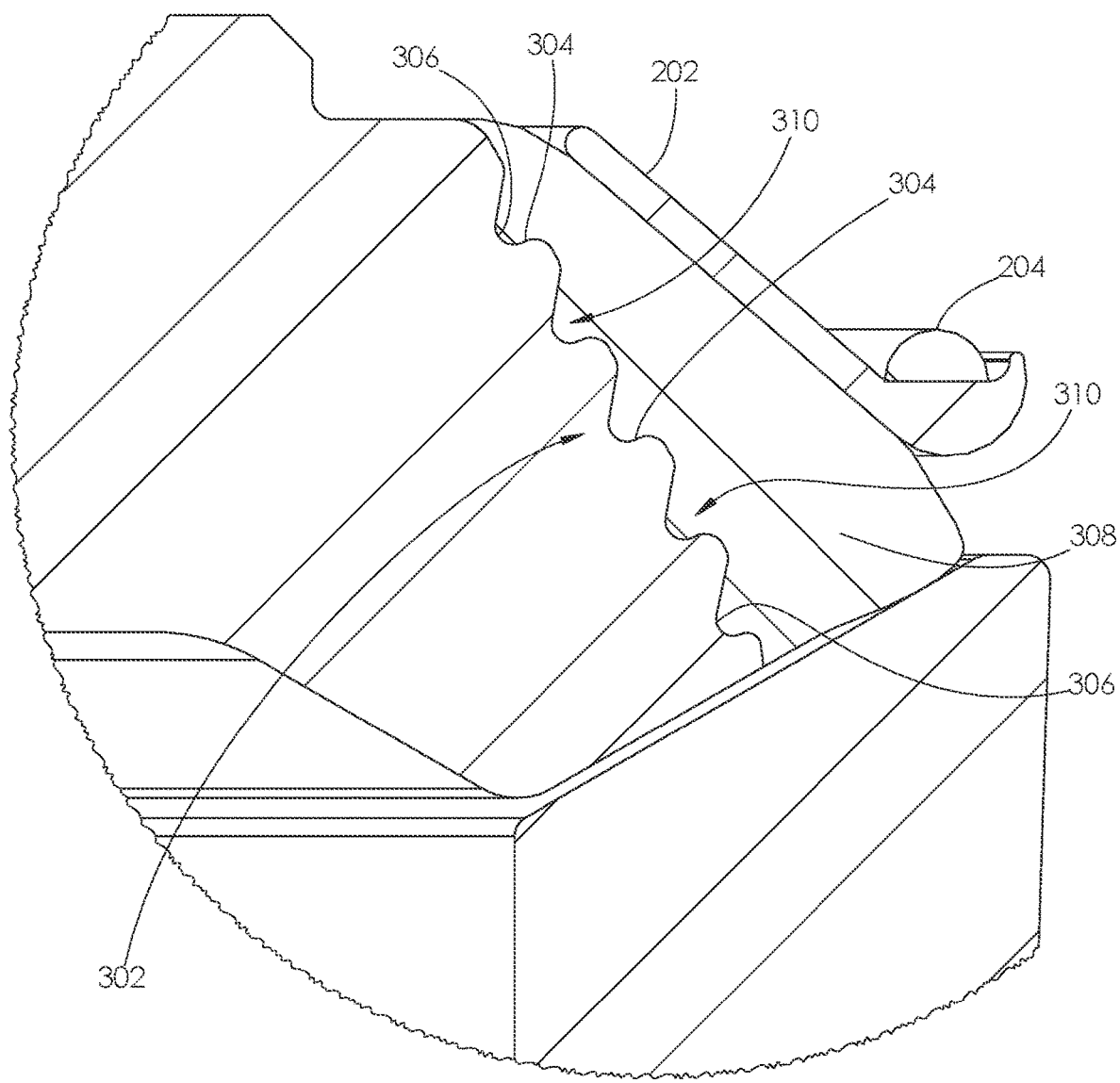
FIG. 41 is an enlarged view of area AC shown in FIG. 40.

Turning to FIGS. 40 and 41, another embodiment of a valve 300 is shown. The valve 300 is identical to the valve 280, but the valve 300 comprises another embodiment of a locking mechanism 302. The locking mechanism 302 is identical to the locking mechanism 282, but a bottom surface 304 of each groove 306 has a positive slope instead of a negative slope. A seal 308 used with the valve 300 comprises a plurality of protrusions 310. The protrusions 310 are identical to the protrusions 292, but the protrusions 310 are shaped to mate with the positively sloped bottom surface 304 of the grooves 306. Forming the grooves 306 with a positively sloped bottom surface 304 provides a more sharply angled bottom surface 304. The corresponding shape of the protrusions 310 is harder to tear during operation. The grooves 306 also have a smoother transition between adjacent grooves 306. The smoother transition creates more surface area for the seal 308 to compress before tearing.

Continuing with FIGS. 40 and 41, the valve 300 also uses the conical sleeve 202 and spring 204 used with the valve 200. In alternative embodiments, the valve 300 may not use the conical sleeve 202 and instead be used with the spring 40 or 168, shown in FIGS. 2 and 23.

A plurality of kits may be useful with the various embodiments of valves disclosed herein. One embodiment of a kit may comprise a valve, a conical sleeve, and/or a spring. Another embodiment of a kit may further comprise a valve seat.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:
1. An apparatus, comprising:
a valve configured to seal against a valve seat, the valve comprising:
a tapered sealing surface joined to a side surface by a recessed surface, the recessed surface forming a recess within the valve, the recessed surface comprising:
a plurality of straight-line segments, the plurality of straight-line segments comprising: L1, L2, L3, L4, and L5; and
a plurality of radius segments, the plurality of radius segments comprising: R1, R2, R3, R4, and R5;
in which L1 is positioned intermediate the tapered sealing surface and R1;
in which L2 is positioned intermediate R1 and R2;
in which L3 is positioned intermediate R2 and R3;
in which L4 is positioned intermediate R3 and R4; and
in which L5 is positioned intermediate R4 and R5; and
in which R5 is positioned intermediate L5 and an upper surface of the valve; and
a seal installed within the recess and engaging the plurality of straight-line segments and the plurality of radius segments of the recessed surface; in which at least a portion of the tapered sealing surface and at least a portion of the seal are configured to seal against the valve seat.
2. The apparatus of claim 1, in which L2 is greater than L4, L4 is greater than L3, and L3 is greater than L1.
3. The apparatus of claim 1, in which R1 is greater than R3, R3 is greater than R2, and R2 is greater than R4.
4. The apparatus of claim 1, in which an outer surface of the seal comprises:
a first section joined to a second section, the second section comprising a point, P;
in which the first section engages L1 and is coplanar with the tapered sealing surface of the valve;
in which the valve is movable between open and closed positions; in which the first and second sections of the seal are engaged with the valve seat when in the closed position; and
in which the second section extends in a downwards direction towards the valve seat such that P engages the valve seat before the first section of the seal when the valve moves to the closed position.
5. The apparatus of claim 1, in which a space exists between the first section of the seal and the valve seat upon contact of P with the valve seat; and in which the space ranges from 0.015 to 0.035 inches.
6. The apparatus of claim 4, in which the valve seat comprises a strike face; in which the first and second sections of the seal engage the strike face when in the closed position and a length of such engagement is defined by a length, F; in which F starts at a point, F1; in which F1 aligns with a point of contact between the tapered sealing surface and the first section of the seal; and in which P is located a distance between 60-80% of the total length of F, starting from F1.

7. The apparatus of claim 1, in which no channels are formed in an outer surface of the seal.

8. The apparatus of claim 4, in which the first section of the seal has a concave shape.

9. The apparatus of claim 4, in which the second section of the seal has a convex shape.

10. The apparatus of claim 1, in which an outer surface of the seal does not have any straight-line sections and is one continuous curve.

11. The apparatus of claim 10, in which the one continuous curve is a splined curve.

12. The apparatus of claim 1, in which the valve further comprises:

a lower surface joined to the tapered sealing surface; and a plurality of legs extending from the lower surface, the plurality of legs configured to be disposed within a central passage formed within the valve seat.

13. The apparatus of claim 1, in which the valve further comprises:

an elongate stem projecting from an upper surface of the valve.

14. A valve assembly, comprising:

the apparatus of claim 1; and a valve seat.

15. A fluid end, comprising:

a housing having an external surface and an internal chamber;

a conduit formed in the housing and connecting the internal chamber to the external surface; and the valve assembly of claim 14 installed within the conduit.

* * * * *

UNITED STATES PATENT AND TRADEMARK OFFICE
CERTIFICATE OF CORRECTION

PATENT NO. : 11,808,364 B2
APPLICATION NO. : 17/984406
DATED : November 7, 2023
INVENTOR(S) : Thomas et al.

Page 1 of 1

It is certified that error appears in the above-identified patent and that said Letters Patent is hereby corrected as shown below:

In the Claims

Column 12, Line 29, Claim 1, please delete "and".

Signed and Sealed this
Fifth Day of December, 2023

Katherine Kelly Vidal
*Director of the United States Patent and Trademark Office*